(12) United States Patent
Kwan et al.

(10) Patent No.: US 9,762,610 B1
(45) Date of Patent: Sep. 12, 2017

(54) LATENCY-BASED POLICY ACTIVATION

(71) Applicant: Palo Alto Networks, Inc., Santa Clara, CA (US)

(72) Inventors: Philip Kwan, San Jose, CA (US); Chang Li, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 23 days.

(21) Appl. No.: 14/929,136

(22) Filed: Oct. 30, 2015

(51) Int. Cl.
*H04L 29/06* (2006.01)

(52) U.S. Cl.
CPC .......... *H04L 63/1458* (2013.01); *H04L 63/02* (2013.01); *H04L 63/1416* (2013.01); *H04L 63/1425* (2013.01); *H04L 63/20* (2013.01)

(58) Field of Classification Search
CPC ..... H04L 63/02; H04L 63/20; H04L 63/1458; H04L 63/1416; H04L 63/1425
See application file for complete search history.

(56) References Cited

U.S. PATENT DOCUMENTS

| | | | |
|---|---|---|---|
| 9,282,116 B1* | 3/2016 | Rovniaguin | ........ H04L 63/1458 |
| 2003/0084328 A1* | 5/2003 | Tarquini | ................ G06F 21/552 726/23 |
| 2003/0084340 A1* | 5/2003 | Schertz | ................... G06F 21/55 726/23 |
| 2004/0039938 A1* | 2/2004 | Katz | .................. H04L 63/1458 726/2 |
| 2005/0108551 A1* | 5/2005 | Toomey | .................. G06F 21/31 713/185 |
| 2005/0195840 A1* | 9/2005 | Krapp | ................. H04L 43/0894 370/401 |
| 2006/0059568 A1* | 3/2006 | Smith-lMickelson | ......... H04L 12/2602 726/27 |
| 2010/0161741 A1* | 6/2010 | Jiang | ....................... H04L 63/02 709/206 |
| 2010/0235506 A1* | 9/2010 | Barrett | ................ H04L 63/1408 709/225 |
| 2011/0099622 A1* | 4/2011 | Lee | ......................... H04L 43/16 726/13 |
| 2011/0138463 A1* | 6/2011 | Kim | ..................... H04L 63/1425 726/22 |
| 2012/0117646 A1* | 5/2012 | Yoon | .................... H04L 63/0254 726/22 |
| 2013/0343181 A1* | 12/2013 | Stroud | .................... H04L 43/50 370/229 |
| 2013/0343378 A1* | 12/2013 | Veteikis | .................. H04L 43/50 370/389 |
| 2016/0234230 A1* | 8/2016 | Rovniaguin | ........ H04L 63/1458 |
| 2017/0012975 A1* | 1/2017 | Ilyadis | .................... H04L 63/08 |

* cited by examiner

*Primary Examiner* — Darren B Schwartz
*Assistant Examiner* — Thomas Gyorfi
(74) *Attorney, Agent, or Firm* — Van Pelt, Yi & James LLP

(57) ABSTRACT

Techniques for latency-based policy activation are disclosed. In some embodiments, a system for latency-based policy activation includes collecting a plurality of latency measures associated with monitored network communications; correlating the plurality of latency measures associated with the monitored network communications to detect anomalous network activity based on a profile; and performing a mitigation response to the anomalous network activity based on a policy.

21 Claims, 17 Drawing Sheets

1100

Latency | Network | Protect

Thresholds

Max New Session Latency
- Alert (ms): 1000
- Activate (ms): 1500
- Maximum (ms): 5000
- Duration (ms): 10000
- Action: Random Early Drop ▼

Max Application Latency
- Alert (ms): 1000
- Activate (ms): 1500
- Maximum (ms): 5000
- Duration (ms): 10000
- Action: Reset Both ▼

Repeat Offenders
☑ Block IP of repeat offenders after: 3 times
Block duration (sec): 300

— 1102

Correlation Rules
☑ Ordered Condition Match

| | Condition | Context | Operator | Value |
|---|---|---|---|---|
| ☐ And Condition 1 | Or Condition 2 | Packet Rate to Latency | Greater Than | 2.50 |
| ☐ And Condition 3 | Or Condition 3 | Requests to Unique Clients | Less Than | 0.80 |
| ☐ | | | | |

+Add Or Condition  +Add And Condition  -Delete  Move Up  Move

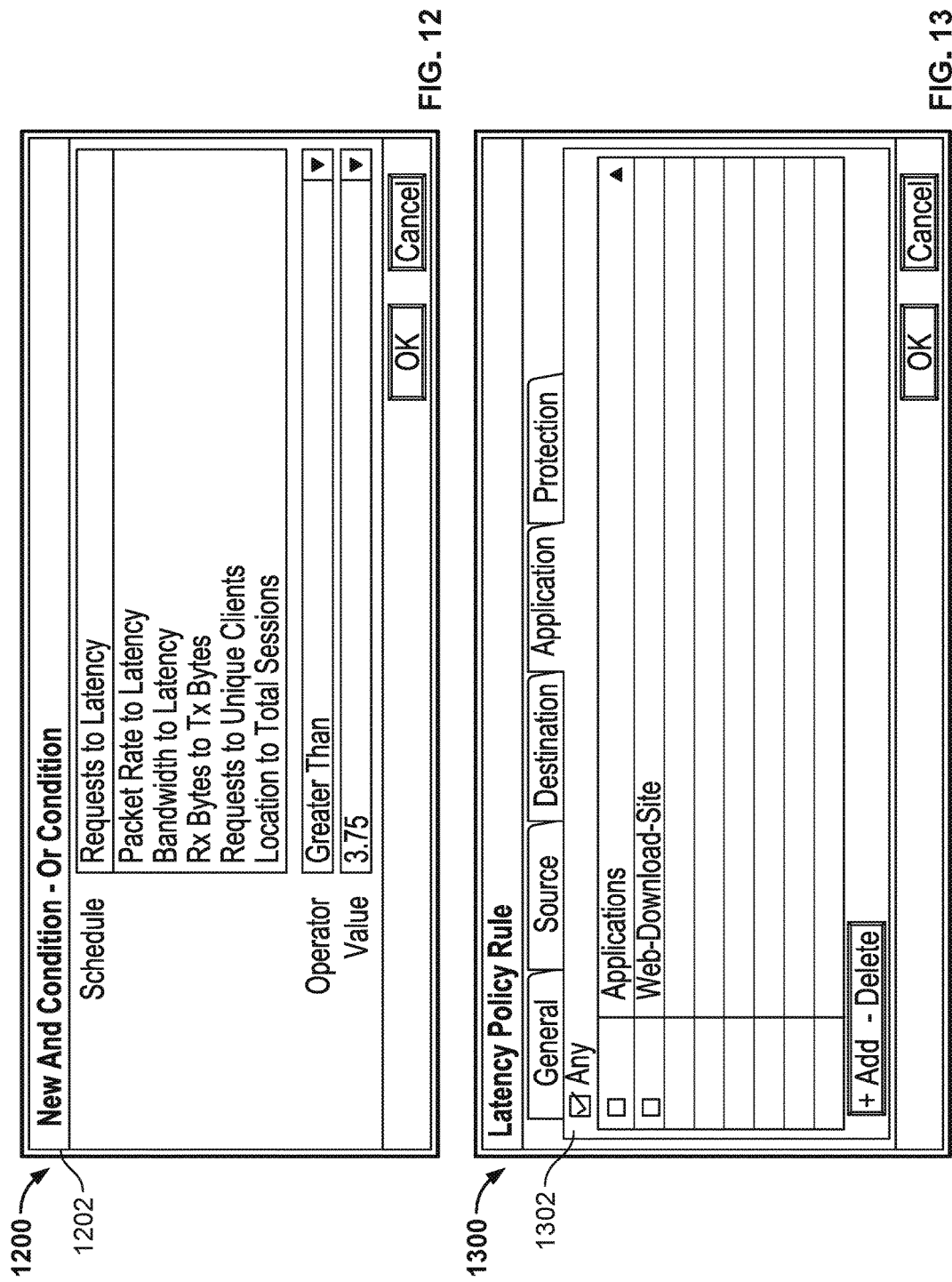

LATENCY-BASED POLICY ACTIVATION

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 11 is another diagram illustrating a screen shot of an interface for providing latency-based policy activation in accordance with some embodiments.

FIG. 12 is another diagram illustrating a screen shot of an interface for providing latency-based policy activation in accordance with some embodiments.

FIG. 13 is another diagram illustrating a screen shot of an interface for providing latency-based policy activation in accordance with some embodiments.

DETAILED DESCRIPTION

Figure 1:
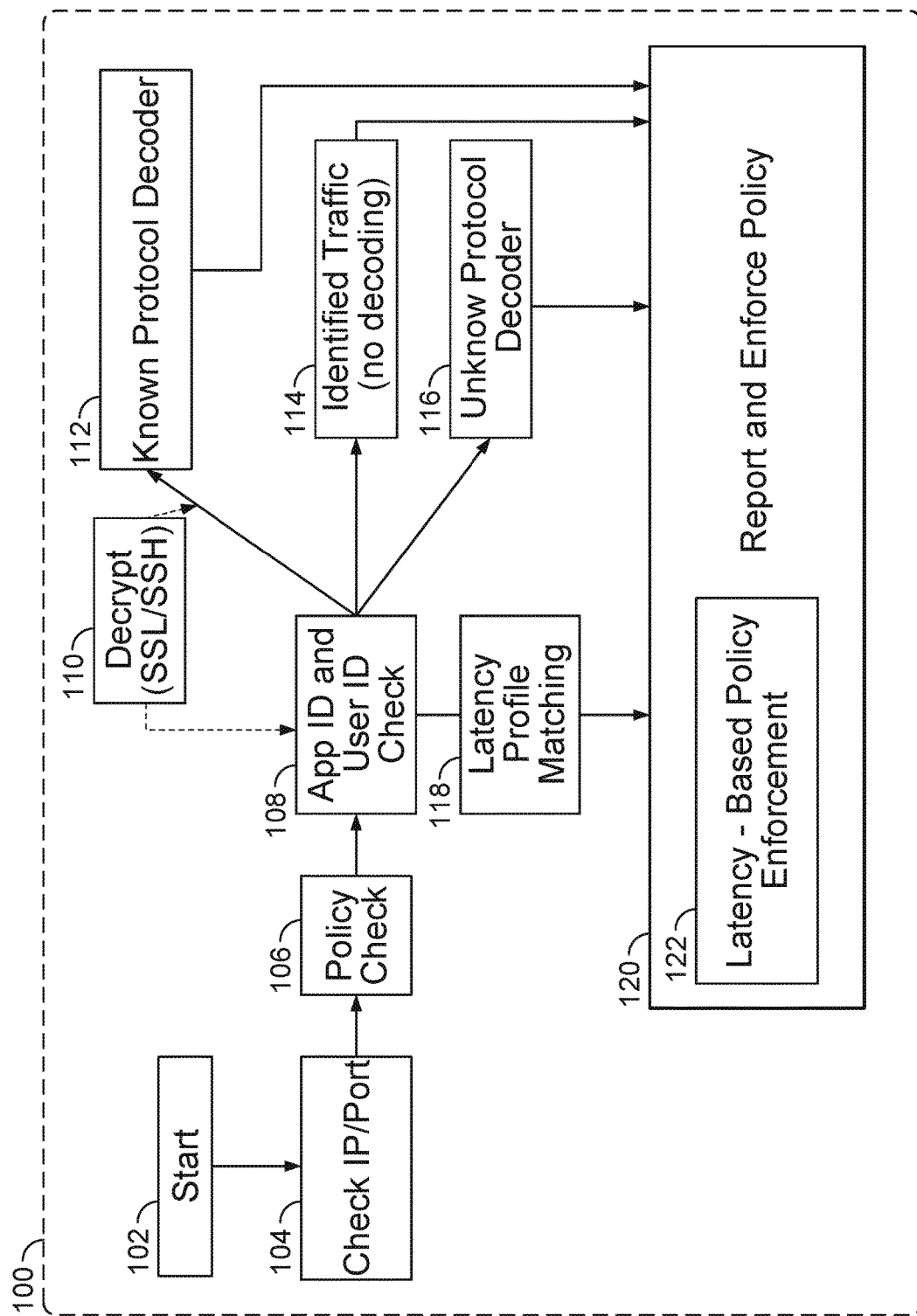
FIG. 1 is a functional diagram of an architecture of a network device that can be used for providing latency-based policy activation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Network devices (e.g., security appliances, security gateways, security services, and/or other security devices) can include various security functions (e.g., firewall, anti-malware, intrusion prevention/detection, Data Loss Prevention (DLP), and/or other security functions, such as detecting and/or blocking Denial of Service (DoS) attacks and/or other types of attacks, intrusions, threats, etc.), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. located in Santa Clara, Calif. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

A significant challenge for security detection techniques is to identify anomalous network activities that are associated with Denial of Service (DoS) or Distributed Denial of Service (DDoS) attacks (e.g., also referred to generally herein as DoS, which can also include application DoS attacks and/or other types of DoS related attacks, such as further described below). For example, a significant increase in network activities for an enterprise web site can be caused by legitimate increases in user activities on the enterprise web site or can be a result of a DoS attack. Failure to properly detect and mitigate in these different scenarios can have negative consequences for the enterprise web site (e.g., revenue and user satisfaction can be impacted by a failure to properly and/or timely mitigate an actual DoS attack and/or by a false positive detection that mitigates legitimate traffic).

In particular, identifying and correctly setting values for a DoS profile's activate and maximum thresholds can often be very difficult for Information Technology (IT) and/or Network administrators (admins) due to a lack of historical connection or other network activity related information (e.g., Connections Per Second (CPS), Packets Per Second (PPS), or other connection/network activity related measurements) on each interface (e.g., each switch port or other network interfaces on an enterprise network). Also, DoS policy thresholds are typically statically set and typically must be manually reset and manually revised each time the protected server/service's capacity changes (e.g., threshold settings cannot dynamically scale with the protected service).

Existing advanced DoS approaches typically attempt to provide additional protection by monitoring a large number of applications, protocols, and traffic activity and attempting to identify potentially abnormal patterns. The drawback of these existing advanced DoS approaches is the amount of data points that need to be gathered, computed, and correlated. This generally requires a great deal of logging capacity and CPU resources to perform the statistical analysis in near real-time. Also, due to the complexity, many IT/network admins often enable DoS protection with the default thresholds, which can often result in false negatives (e.g., certain DoS attacks being permitted through the firewall) and/or can result in false positives (e.g., legitimate traffic being identified as a DoS attack). Current approaches require network admins to essentially use a best guess, constant revising approach to configure such DoS protection features, which is both labor intensive and increases security risks as false negatives/positives can result from these existing advanced DoS approaches. Also, many other external network monitoring tools must be leveraged as part of the historical statistics learning in order to properly set thresholds for these existing advanced DoS approaches.

As such, existing approaches fail to adequately address the above-described problems.

Overview of Techniques for Latency-based Policy Activation

Thus, what are needed are new and improved techniques for latency-based policy activation. Accordingly, techniques for latency-based policy activation are disclosed.

In some embodiments, a system, process, and/or computer program product for latency-based policy activation includes collecting a plurality of latency measures associated with monitored network communications at a network device (e.g., which can include a firewall); correlating the plurality of latency measures associated with the monitored network communications to detect anomalous network activity based on a profile; and performing a mitigation response to the anomalous network activity based on a policy. For example, the anomalous network activity can be determined to be associated with a Denial of Service (DoS) attack.

In one embodiment, a system, process, and/or computer program product for latency-based policy activation further includes monitoring network communications at the network device.

In one embodiment, a system, process, and/or computer program product for latency-based policy activation further includes receiving network resource reports from one or more network resource monitors for a protected application/service at the network device. For example, an agent can be deployed to and executed on a server associated with the protected application/service, and the agent can provide periodic network usage reports to the network device.

In one embodiment, a system, process, and/or computer program product for latency-based policy activation further includes generating a profile for a protected application or a protected service on an enterprise network based on the plurality of latency measures associated with the monitored network communications, wherein the profile includes one or more latency thresholds.

In one embodiment, a system, process, and/or computer program product for latency-based policy activation further includes dynamically updating a profile for a protected application or a protected service on an enterprise network based on one or more latency measures associated with the protected application or the protected service on the enterprise network based on the monitored network communications.

In one embodiment, a system, process, and/or computer program product for latency-based policy activation further includes sending data associated with the anomalous network activity to another network device or a cloud security service.

In one embodiment, a system, process, and/or computer program product for latency-based policy activation further includes receiving data associated with another anomalous network activity from another network device or a cloud security service.

In one embodiment, a system, process, and/or computer program product for latency-based policy activation further includes throttling or blocking network communications in response to a detected DoS attack based on the policy. For example, throttling or blocking network communications to a protected application or a protected service in response to a detected DoS attack based on the policy (e.g., a DoS policy) can be performed by the network device (e.g., firewall).

In one embodiment, a system, process, and/or computer program product for latency-based policy activation further includes reducing or terminating the mitigation response if one or more of the latency measures no longer exceed one or more latency thresholds.

In one embodiment, a system, process, and/or computer program product for latency-based policy activation further includes dynamically generating a defense signature based on the traffic pattern analysis. For example, a defense signature can be automatically and dynamically generated to identify the offending traffic (e.g., based on historical trends analysis for a protection application/server).

For example, in order to reduce or eliminate the above-described dependence on historical CPS/PPS information for manually setting DoS policy thresholds, the disclosed techniques for latency-based policy activation can dynamically adjust to the enterprise network environment by examining the latency of the packets incoming and outgoing to the protected application/service (e.g., a web site, download/FTP server, or another protected application/service). The protected application's/service's communications will be monitored for a latency threshold(s) using one or more analytical methods, which can include, for example, ICMP health checks, packet latency (e.g., latency between SYN and SYN/ACK), and/or other forms/types of latency measurements based on a custom application identification (APP ID) signature (e.g., data transfer after HTTP GET is requested or another APP ID signature). In an example implementation, the network device (e.g., implementing a firewall) can retain sufficient historical latency measurements and/or network resource reports related information to allow it to learn an application's/service's behavior over time in order to identify normal versus abnormal network activity and/or network resource related trends (e.g., based on a behavior profile associated with the protected application/service based on monitoring network usage activities and network resource activities associated with the protected application/service). Based on the monitored network usage activities and network resource activities associated with the protected application/service, the network device can enable/disable different security/DoS policies to perform mitigation (e.g., policy activation and enforcement) once a latency threshold(s) is exceeded based on the profile for the protected application/service.

As disclosed herein in accordance with various embodiments, by using latency, which provides a fundamental but reliable and efficient metric, the need to gather, correlate, and analyze dozens to hundreds of other/non-latency related statistical parameters can be reduced or, in some cases, eliminated entirely. As an example, in a typical DoS attack scenario, the goal of the attacker is generally to take down the targeted service through some form of volumetric function. During the DoS attack, the targeted application's/service's ability to respond to new requests and service ongoing sessions will often diminish as the attack takes hold and overwhelms the application's/service's ability to respond to the new requests and ongoing sessions. Using the disclosed techniques, latency is monitored and analyzed as a common measurement under such DoS attack related stress conditions, and such latency measures can be correlated to, for example, CPS, PPS, and bandwidth used by the application/service in order to determine whether to activate mitigation responses based on a DoS policy, such as further described below.

In one embodiment, using the disclosed techniques for monitoring latency for the protected service, the network device can protect the application/service by monitoring the session latency using series of light weight monitoring methodologies. For example, monitoring can be performed using ICMP ping, calculating latency between packets used for session creation (e.g., SYN and SYN/ACK), or other types/forms of measurements can be performed (e.g., based on APP ID, such as the server's response packet to a client's request packet). As a result, these latency related statistics can provide the firewall the capability to learn/adapt latency thresholds over time so that the DoS engine can accurately and automatically identify what is normal versus abnormal network activity/resource usage levels for a particular application/service. In some cases, IP reputation can also be leveraged to perform selective action(s)/response(s). Based on the statistical feedback from the monitored items, the network device can enable or disable a security enforcement policy when a specific latency threshold has been reached/exceeded (e.g., for a predetermined period of time). For example, the firewall can enable an application DoS policy for a protected web application when the latency between client requests and the web server responses exceeds a latency threshold (e.g., 1500 ms or some other time value) and the overall bandwidth utilization on the path is less than a capacity threshold (e.g., 10% of capacity or some other capacity value), as this can indicate abnormal activity based on historical use patterns for the protected web application.

In one embodiment, static default latency thresholds can be configured for one or more latency measures, such as one or more of the latency measures as further described below. In one embodiment, one or more of the latency thresholds are dynamically tuned after a learning mode (e.g., automated adaptation/tuning mode) on an enterprise network for a period of time (e.g., one day, one week, one month or some other period of time can be provided for monitoring a protection application/service to dynamically tune/set one or more latency threshold values for an expected/normal value based on monitored latency measures during that period of time, such as for one or more protected applications/services).

In one embodiment, using the disclosed techniques for monitoring latency for the protected application/service, the network device can dynamically enable/disable DoS, zone (e.g., to apply DoS protection to a zone versus specific interfaces or IP addresses, which can, for example, provide a broad first pass level of protection against malformed packets and common flood attacks), application DoS, or hardware-based ACLs to enforce various latency thresholds. For example, this capability allows the protected application(s)/service(s) to scale without having to manually recalibrate DoS/Zone/App DoS protection policies and can greatly simplify accurate configuration and enable a true "set and forget" capability for DoS protection for an enterprise network. The disclosed techniques can even be used as an underlying safety net with security policies to completely block a particular host, group of hosts, or an application when latency is high (e.g., exceeds one or more latency thresholds for a predetermined period of time). In some cases, the network device can also dynamically disable the security/DoS policy when latency drops back down (e.g., below the one or more latency thresholds for a predetermined period of time).

These and other aspects of the disclosed techniques for latency-based policy activation will be further described below.

A System Architecture of a Network Device Implementing a Firewall for Latency-based Policy Activation FIG. 1 is a functional diagram of an architecture of a network device that can be used for providing latency-based policy activation in accordance with some embodiments. As shown in FIG. 1, network traffic is monitored at a firewall 100. In one embodiment, network traffic is monitored using a data appliance (e.g., a data appliance that includes security functions, such as a security device/appliance that includes a firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) engine (e.g., shown as App ID Check & User ID Check 108 in FIG. 1). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. A policy check engine 106 determines whether any policies can be applied based on the IP address and port number. As also shown in FIG. 1, an App ID Check & User ID Check 108 identifies an application and a user. For example, the application can be identified using an APP-ID engine (108) using various application signatures for identifying applications based on packet flow analysis. The user identification can also be determined based on a source IP address (e.g., based on one or more IP addresses). In this example, the APP-ID engine (108) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to process the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate associated with the network device, such as a data appliance, gateway, or other network device implementing the firewall). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In one embodiment, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., application/APP ID signatures such as further described below, as well as file-based, protocol-based, and/or other types/forms of signatures for detecting malware or suspicious behavior).

In one embodiment, firewall 100 also includes a content-ID engine (not shown). In one embodiment, the content-ID engine's identified content is also used by report and enforce policy engine 120, possibly in various combinations with other information, such as application, user, and/or other information, to enforce various security/firewall policies/rules.

In one embodiment, firewall 100 also includes a latency profile matching component 118 and a latency-based policy enforcement component 122 for providing latency-based policy activation using the firewall (e.g., based on a latency profile match and a policy), such as further described below. In one embodiment, latency profile matching component 118 can perform operations for facilitating latency-based policy activation using the firewall as similarly described herein (e.g., using application signatures), such as further described below. For example, an application signature and a user ID (e.g., associated with a specific website and a specific IP address) can be matched to an application signature using latency profile matching component 118. If there is a match with a latency profile, then firewall 100 can determine a responsive action (e.g., a mitigation action) based on latency-based enforcement policy 122.

In one embodiment, various other functional architectures and flows are provided to implement techniques for providing latency-based policy activation using a firewall as described herein. For example, some of these functions can be implemented in software executed on a general processor and/or some of these functions can be implemented using hardware acceleration techniques for faster packet processing of network traffic, such as further described below.

A Network Architecture for Latency-based Policy Activation

Figure 2:
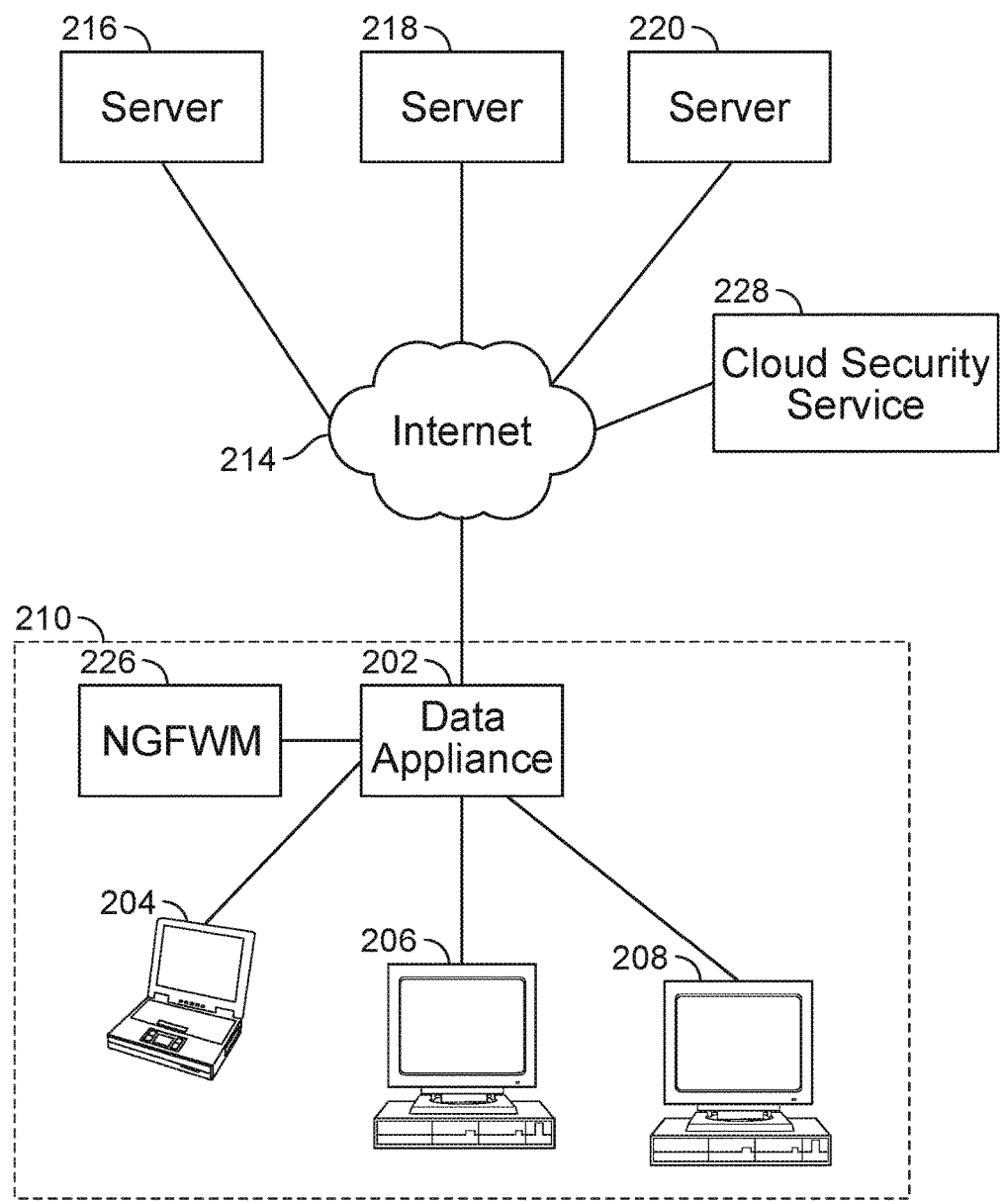
FIG. 2 is a block diagram of a network architecture that can be used for providing latency-based policy activation in accordance with some embodiments.

FIG. 2 is a block diagram of a network architecture that can be used for providing latency-based policy activation in accordance with some embodiments. As shown, a data appliance 202 (e.g., a network device that includes security functions, such as a security appliance/device that includes a firewall, a gateway that includes security functions, such as a security gateway, and/or any other network device that includes a firewall function as described herein) is at the perimeter of a protected network 210, which includes client devices 204, 206, and 208 (e.g., a desktop computer, a server, a laptop, a tablet, a smart phone, or any other client computing device as well as data appliances and/or servers located within protected network 210).

In one embodiment, data appliance 202 includes a firewall component, such as firewall 100 as described above with respect to FIG. 1, to protect the network and clients, data appliances, and/or servers within the protected network 210, which is in communication with the Internet 214 and various servers, such as servers 216, 218, and 220 (e.g., web servers, mail servers, file servers, and/or other types of servers).

As also shown, data appliance 202 can also communicate with a Network Gateway FireWall Manager (NGFWM) 226 for managing one or more such data appliances (e.g., network devices/firewalls, such as data appliance 202). In one embodiment, data appliance 202 can share DoS related analysis/detection/mitigation activities with NGFWM 226, which can then intelligently share that information across one or more other data appliances on the enterprise network (e.g., to provide early warnings for a potential/detected DoS attack on a protected application/service for ACME Company). In an example implementation, the NGFWM can be implemented as a distinct component/server (e.g., located locally or remotely from the one or more managed data appliances) or can be implemented as an integrated component of one or more of the data appliances. For example, the NGFWM can be implemented using commercially available management solutions available from Palo Alto Networks, Inc. for managing multiple network devices/firewalls, such as the Panorama™ network security management for centralized device management that enables users to centrally manage the process of configuring network devices, deploying security policies, performing forensic analysis, and generating reports across an entire network of next-generation firewalls (e.g., available as either a virtual appliance or a dedicated management platform). For instance, the NGFWM can be implemented using commercially available management solutions available from Palo Alto Networks, Inc. or other commercially available management solutions, such as NGFWM servers for management of the network devices/firewalls and an NGFWM console for managing multiple network devices/firewalls.

As also shown, data appliance 202 is in communication with cloud security service 228. In one embodiment, data appliance 202 can share DoS related analysis/detection/mitigation activities with cloud security service 228, which can then intelligently share that information across one or more other data appliances on the enterprise network (e.g., to provide early warnings for potential/detected DoS attacks or a new type of DoS attack vector that is targeting a certain application/service at a particular enterprise and/or across different enterprises that are subscribers/customers of the cloud security service). In an example implementation, the cloud security service can be implemented using a commercially available security service, such as the WildFire™ cloud-based malware analysis environment provided by Palo Alto Networks, Inc.

Hardware Components of a Network Device for Latency-based Policy Activation

Figure 3:
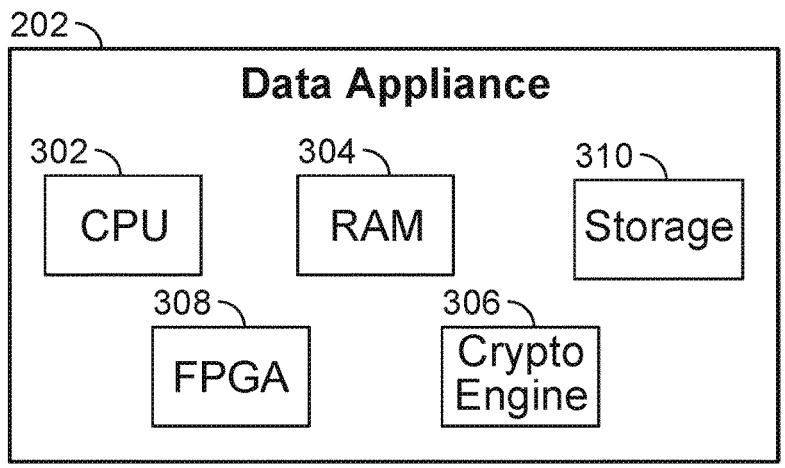
FIG. 3 is a functional diagram of hardware components of a network device for providing latency-based policy activation in accordance with some embodiments.

FIG. 3 is a functional diagram of hardware components of a network device for providing latency-based policy activation in accordance with some embodiments. The example shown is a representation of physical/hardware components that can be included in network device 202 (e.g., an appliance, gateway, or server). Specifically, network device 202 includes a high performance multi-core CPU 302 and RAM 304. Network device 202 also includes a storage 310 (e.g., one or more hard disks or solid state storage units), which can be used to store policy and other configuration information as well as signatures. In one embodiment, storage 310 stores signatures (e.g., application signatures), profiles (e.g., a profile for latency-based policy activation), and policies (e.g., a policy for latency-based policy enforcement) for providing latency-based policy activation using a firewall, such as disclosed herein. Network device 202 can also include one or more optional hardware accelerators. For example, network device 202 can include a cryptographic engine 306 configured to perform encryption and decryption operations, and one or more FPGAs 308 configured to perform signature matching, act as network processors, and/or perform other tasks.

Logical Components of a Network Device for Latency-based Policy Activation

Figure 4:
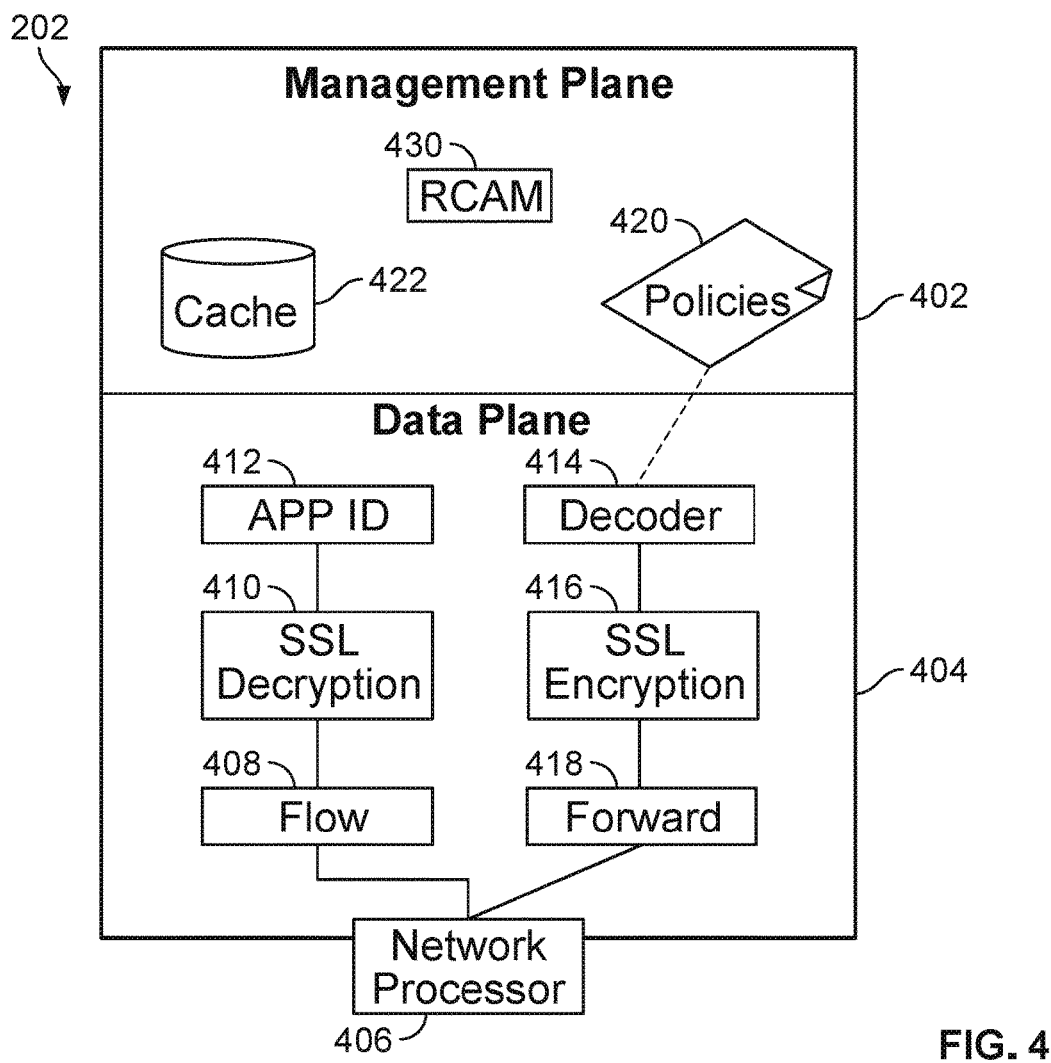
FIG. 4 is a functional diagram of logical components of a network device for providing latency-based policy activation in accordance with some embodiments.

FIG. 4 is a functional diagram of logical components of a network device for providing latency-based policy activation in accordance with some embodiments. The example shown is a representation of logical components that can be included in network device 202. As shown, network device 202 includes a management plane 402 and a data plane 404. In one embodiment, the management plane is responsible for managing user interactions, such as by providing a user interface for configuring policies (e.g., including rules and/or signatures) and viewing log data. The data plane is responsible for managing data, such as by performing packet processing and session handling. In one embodiment, root cause analysis modules (RCAM) 430 for latency-based policy activation are executed within management plane 402 as shown in FIG. 4 and as further described below with respect to FIG. 5.

Suppose a client 204 attempts to access a server 216 using an encrypted session protocol, such as SSL. Network processor 406 is configured to receive packets from client 204, and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 (e.g., as similarly described above with respect to decrypt component 110 of FIG. 1) using various techniques as described herein. Otherwise, processing by SSL decryption engine 410 is omitted. Application identification (APP ID) module 412 is configured to determine what type of traffic the session involves and to identify a user associated with the traffic flow (e.g., as similarly described above with respect to App ID and User ID check component 108 of FIG. 1). For example, APP ID 412 can recognize a GET request in the received data and conclude that the session requires an HTTP decoder. For each type of protocol, there exists a corresponding decoder 414 (e.g., as similarly described above with respect to network traffic processing components 112, 114, and 116 of FIG. 1). In one embodiment, the application identification is performed by an application identification module (e.g., APP-ID engine), and a user identification is performed by another function/engine. Based on the determination made by APP ID 412, the packets are sent to an appropriate decoder 414. Decoder 414 is configured to assemble packets (e.g., which may be received out of order) into the correct order, perform tokenization, and extract out information. Decoder 414 also performs signature matching to determine what should happen to the packet. SSL encryption engine 416 performs SSL encryption using various techniques as described herein. As also shown, policies 420 are received and stored in the management plane 402. In one embodiment, policy enforcement (e.g., policies can include one or more rules, which can be specified using domain and/or host/server names, and rules can apply one or more signatures, including application signatures, or other matching criteria or heuristics, such as for providing latency-based policy activation as disclosed herein) is applied as described herein with respect to various embodiments based on the monitored, decrypted, identified, and decoded session traffic flows.

As also shown in FIG. 4, a cache 422 (e.g., a behavior cache) is also provided for maintaining a behavior table (e.g., behavior table 506 of FIG. 5) that can be used to implement the disclosed techniques for latency-based policy activation as will be further described below. As will be further described below with respect to FIG. 5, the behavior cache can be maintained in the management plane and/or the data plane of the network/security device.

Various example use case scenarios for applying latency-based policy activation techniques will be described in the next section.

Example Use Case Scenarios for Latency-based Policy Activation

University Network Use Case

As a first example use case scenario, university networks are often hit with volumetric DoS attacks that can originate within the university/campus network or externally from the Internet. As universities often lack sophisticated network management tools that can help trend network activity/usage patterns, universities typically do not have an accurate and efficient way to determine the DoS and zone protection profile thresholds (e.g., threshold values for rules for firewalls for DoS and zone protections/mitigations/enforcement). In many cases, the university's IT resources, such as DNS servers, HTTP servers, and FTP servers, are targets, and the attacks are generated from a single IP address (e.g., often a server that was compromised/hacked and turned into an attack source, such as a command and control (CNC) attack).

The IT admin usually accepts the default values for the DoS and zone protection profile thresholds as a starting point—only to find that a very high volume of flood attacks are able to make their way through the university's enterprise network with no mitigation from the firewall. Tuning the DoS and zone protection thresholds often then becomes a trial and error manual/user implemented approach, which can require many iterations of setting and waiting for the next attack as a feedback mechanism.

But as new services come online in the protected zone or network, the trial and error working thresholds become stale and often need to be manually recalibrated. This introduces a new round of trial and error configuration until new workable thresholds can be manually determined. As such, the existing approaches are generally inaccurate and inefficient as such a trial and error tuning of DoS and zone protection thresholds is both user/labor intensive and error prone.

What is needed are techniques to automatically determine and configure such DoS and zone protection thresholds and have the firewall regulate the thresholds as needed to ensure a service on an enterprise network is not taken offline by a DoS attack.

For example, using the disclosed latency-based policy activation techniques, the firewall can enable a DoS policy and dynamically adjust the activate and maximum thresholds when the latency between client requests and server responses exceeds a predetermined latency threshold (e.g., 1500 ms for a critical application or some other latency threshold value as further described below). In an example implementation, a policy defined by the IT/network admin can specify the acceptable latency values, and the firewall can enforce using various enforcement policies (e.g., a DoS policy, a security policy (if needed), and/or other enforcement policy).

Web Server Use Case

As a second example use case scenario, web servers are often critical business resources for enterprises that allow users/customers to gain access to public information as well as sign onto various portal services (e.g., an online/web store, an online web service, or another portal service). Applications, databases, and operating systems (OSs) running on these servers should not be impacted by DoS attacks as downtime can be extremely costly—in many cases, both in dollar value and customer perception/enterprise image. However, it is very difficult to keep track of all the different metrics to isolate an attack versus a bottleneck in one of the critical components. For example, when a customer's web page refresh rate is very slow, it can be due to a number of attributes, such as a slow network, overloaded server resources, application performance, network-based attack, application-based attack, or some other factor. As a result, this poses a challenging problem for an IT administrator to figure out if it is an attack or a resource issue in their server/network.

As further described herein, a common denominator that can be utilized for determining whether it is an attack or a resource issue associated with a server/network is the measurement of latency, such as the latency measure between a customer's requests and an associated server response. By using latency measures as an initial threshold for DoS policy activation using the disclosed techniques, various mitigation responses can be activated, such as sending a notification to alert the IT administrator. In addition, key metrics can be automatically weighed against the latency to isolate the cause such as using root cause analysis as further described below with respect to FIG. 5. Example potential causes include the following: session latency can be compared to network use; server interface latency can be compared to network use; application response time can be compared to network use; application CPS/PPS can be compared to network use; originating geographical (geo) region information can be compared to network use; and/or various other potential causes can be determined using various other latency related metric comparisons. Based on analytics of key correlation events, the firewall can dynamically adjust various parameters to mitigate a potential DoS attack, such as session limits, new CPS, PPS, and/or activate/deactivate zone and DDoS mitigation rules.

For example, IT/network administrators generally do not want trigger mitigation responses that may impact legitimate web service traffic (e.g., do not want to block/drop legitimate user traffic to an online web store for ACME Company based on false positives). For example, a Black Friday sale, release of a popular new service/product, or other event/promotion can cause a significant increase in latency for an online web store/service. The disclosed techniques for latency-based policy activation can be applied to accurately and efficiently identify whether such a spike in one or more latency measures is associated with legitimate traffic versus illegitimate traffic (e.g., a potential type of DoS attack). For instance, if the increase in the one or more latency measures is determined to be associated with legitimate traffic, then a notification to increase compute capacity for the web site/portal can be provided (e.g., an automated alert/response to spin-up a greater number of virtual machines, etc.), and such legitimate traffic is not denied/blocked/throttled (e.g., as such can cost revenue/reputation for the web site/portal provider as similarly discussed above). However, if the increase in the one or more latency measures is determined to be associated with illegitimate traffic (e.g., a potential type of DoS attack), then various granular remediation of the potential/detected DoS attack can be performed, such as one or more of the mitigation responses as described herein (e.g., including sharing information across one or more other network devices/firewalls for the enterprise using a network device/firewall manager and/or cloud security service, ACME Company in this example, and/or other geographies using various communication techniques across such network devices/firewalls such as similarly described herein).

Application DoS Use Case

As a third example use case scenario, application DoS attacks are becoming more common as attackers know that they can bypass the traditional firewall policies to attack a given service (e.g., HTTP application, DNS application, FTP application, and/or other service/application). With application DoS attacks, traditional firewalls generally do not provide an efficient or effective way to mitigate the malicious activity associated with such application DoS attacks that target legitimate services that customers/users are permitted to access.

Examples of application DoS attacks will now be described. A file download attack generally refers to an attack that overwhelms a file download server(s) by downloading large files repeatedly from many different source hosts. An excessive search attack generally refers to an attack that overwhelms a database server(s) by generating high volumes of search activity from many different source hosts. A brute force authentication attack generally refers to a dictionary attack that attempts to guess an account/password from many different source hosts. An SSL connection exhaustion attack generally refers to an attack that overwhelms SSL server resources by generating many empty SSL connections from many different source hosts. A DNS query attack generally refers to an attack that overwhelms a DNS server(s) by requesting the name of different FQDNs at high rates from many different source hosts. Various other types of application DoS attacks exist and/or new types of application DoS attacks may be deployed for existing and/or new applications.

With traditional CPS/PPS-based DoS mitigation approaches, there generally is no application intelligence to allow granular DoS inspection. As a result, it is typically a challenging problem for enterprise networks to differentiate between legitimate/good application traffic and illegitimate/bad application traffic. As such, this presents a technically difficult problem to determine which application network traffic activity should be permitted by a firewall.

However, using the disclosed techniques, application functions can be monitored for latency, which can then be applied to one or more latency thresholds to determine whether to implement latency-based policy activation. For example, when the latency surpasses the assigned latency threshold(s), key metrics can be weighed against the application's historic trends (e.g., application profile) to isolate the root cause, such as further described below with respect to FIG. 5. In some cases, metrics described above with respect to the second use case scenario and/or other metrics can be used to gather intelligence to isolate the component that is out of normal operating ranges.

In an example implementation, application and custom vulnerability objects can be used to create application signatures that fingerprint a specific application's function to allow latency monitoring for that specific activity. Based on latency between requested services and server/application response, security policy, QoS, and/or various other DoS and throttling mechanisms can be used to control access and preserve application availability. In addition, geo-region information, concurrent sessions per unique IP address, PPS rates per unique IP address, and/or new CPS per unique IP address can be used to isolate the abuse root cause.

In some cases, latency by itself can also be used to trigger throttling mechanisms without comparing metrics from other areas as well. The disclosed techniques do not require any other correlation or metrics to provide benefits as mentioned in the above-described use case scenarios. As further discussed below, the additional activities and correlations can be implemented to isolate root cause(s), which can be performed to determine which mitigation techniques should be applied by the firewall. As an example, raw packet throttling (e.g., random early drop) can be used as a sole mitigation technique in some cases.

Accordingly, enterprise networks that are frequently attacked with DoS, DDoS, and application DoS attacks can benefit from the disclosed techniques of latency-based policy activation. The disclosed techniques facilitate enhanced protection and security for responding to and/or mitigating such DoS, DDoS, and application DDoS attacks, such as further described below.

Figure 5:
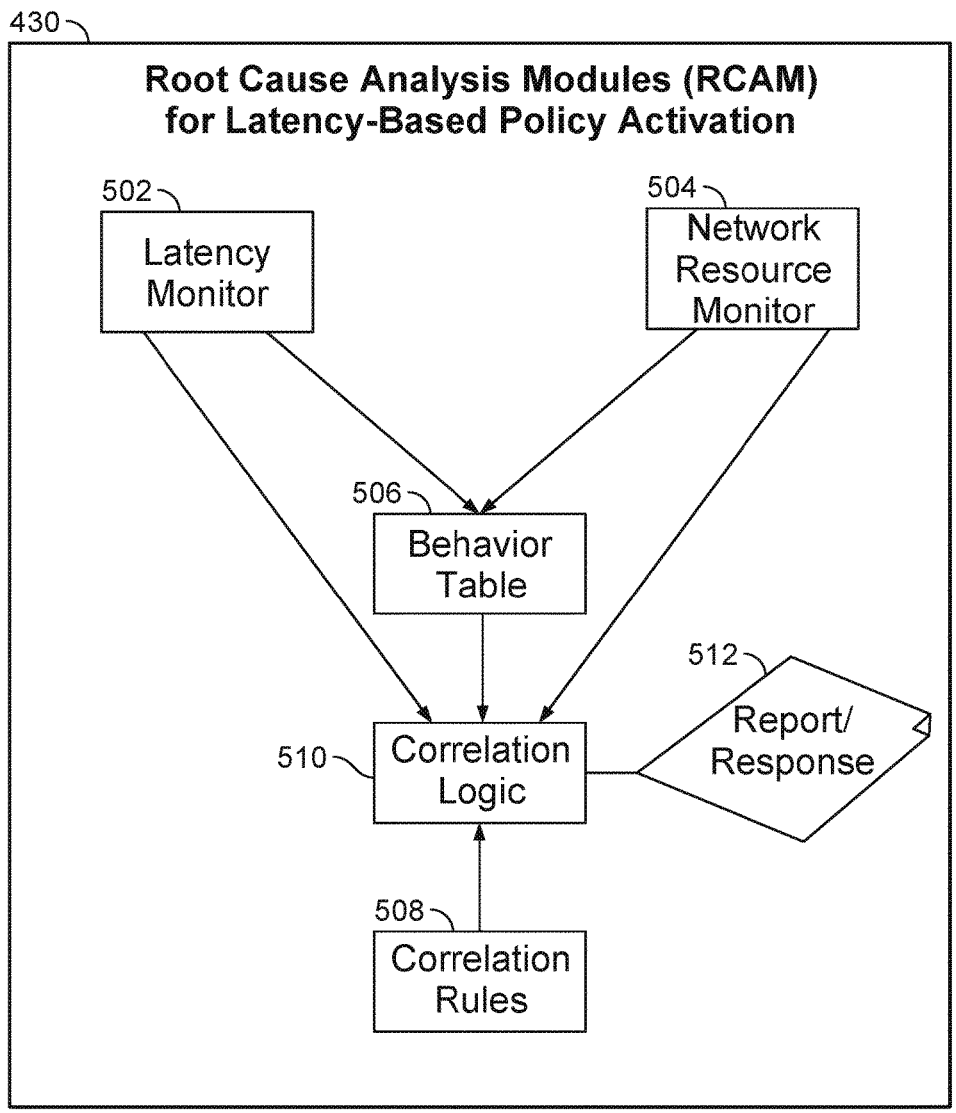
FIG. 5 is a functional diagram of root cause analysis modules of a network device for providing latency-based policy activation in accordance with some embodiments.

Root Cause Analysis Modules of a Network Device for Latency-based Policy Activation FIG. 5 is a functional diagram of root cause analysis modules of a network device for providing latency-based policy activation in accordance with some embodiments. In one embodiment, root cause analysis modules (RCAM) 430 for latency-based policy activation are executed within management plane 402 as shown in FIG. 4. In one embodiment, root cause analysis modules (RCAM) 430 for latency-based policy activation are executed within data plane 404 of firewall 202.

Latency Monitor

As shown in FIG. 5, root cause analysis modules 430 for latency-based policy activation include a latency monitor component 502. In one embodiment, latency measurements can be monitored to track the request and response times to and from a protected service or application function. In most cases, latency measurements are not used by themselves to determine if a service/application function is under duress, but are used in correlation with network usage and historical data points, such as further described below.

For example, latency measurements are taken at several protocol layers, including the following network protocol layers: application layer, HTTP layer, IP layer, and TCP/UDP layer. In an example implementation, mechanisms can be provided to monitor the protected service(s) for latency at each of these different network protocol layers as described below.

At the IP layer, ICMP pings can be performed to measure latency between a network device (e.g., firewall implemented by the network device) and a monitored service's IP address. ICMP generally allows a firewall to determine if the path between the firewall and the protected service is potentially in a high latency state.

At the TCP layer, new TCP session latency can be monitored to measure the latency between a new TCP session's SYN and the server's SYN/ACK response. This TCP layer latency measure allows a firewall to determine if the service is responding to new connections in a timely manner.

At the UDP layer, new UDP session latency can be monitored to measure the latency between a new UDP session's initial packets. This UDP layer latency measure allows a firewall to determine if the service is responding to new connections in a timely manner.

At the application layer, application response latency can be monitored to measure latency of specific application functions. This application layer latency measure allows a firewall to monitor latency for specific application functions, such as for HTTP GET and POST operations. In an example implementation, specific application functions can be defined using custom App IDs that are currently used for Application DoS to tie the specific application function to an application latency measure. In an example implementation, a management plane (e.g., management plane 402) can be used to perform application connections to test the application latency for specific application functions.

In an example implementation, each latency monitoring mechanism can be used in conjunction with one or more of the other latency mechanisms, such as further described below. Such an implementation can reduce and/or eliminate false positives/negatives in various situations. For example, the application latency can be used in conjunction with (e.g., correlated with) ICMP ping to determine if the network path is normal during a slow application response, which can help eliminate the possibility of a congested network. Similarly, the number of new connections coming into the service can be correlated to determine if there is an abnormal number of sessions hitting the service during the slow down.

As further described below, the network device/firewall can store the collected/received latency measurement information in a behavior table 506 to facilitate correlation and to determine whether to trigger latency-based activation responses/defenses.

Network Resource Monitor

As also shown in FIG. 5, root cause analysis modules 430 for latency-based policy activation includes a network resource monitor component 504. In one embodiment, network resource measurements can be monitored to track network resource utilization. As further described below, various network resource measurements can then be used to correlate against the above-described various latency measurements to determine if the network or the protected service is operating under latency duress to determine whether to trigger latency-based activation.

In one embodiment, network resource measurements are performed by a firewall to provide the ability to track critical network resources and counters for a protected service. Examples of network resource measurements that can be performed by the firewall will now be described.

Connections Per Second (CPS) can be determined for new connections accessing the service. For example, CPS can be monitored for each unique source IP address. As another example, CPS can be monitored for the total going to and from the service.

Packets Per Second (PPS) can be determined for traffic flows going to and from the service. For example, PPS can be monitored for each unique source IP address. As another example, PPS can be monitored for the total going to and from the service.

Bandwidth used by the protected service can be determined. For example, bandwidth for each unique source IP address can be monitored. As another example, bandwidth for the total going to and from the service can be monitored.

In an example implementation, agents can be deployed and executed on the protected servers to collect one or more of the above-described network resource measurements and report back to the network device/firewall. As further described below, the network device/firewall can store the collected/received network resource measurement information in behavior table 506 to facilitate correlation and to determine whether to trigger latency-based activation responses/defenses. As an example, based on a given server's resource monitoring, a specific type of response/defense can be performed (e.g., IP block, limit HTTP GET, etc.).

Historical Trending for Profile Generation and/or Adaptation

In one embodiment, historical trending for profile generation and/or adaptation is performed to facilitate configuration and/or updating of profiles of protected services/servers on an enterprise network. For example, historical trends can be monitored to determine usage patterns for the service being protected on the enterprise network. Also, correlation ratios can be used to provide more additional usage and behavioral views to lower possibilities of false positives/negatives.

In an example implementation, each historical measurement can be stored (e.g., using a cache 422 or other cache/data store in management plane 402) for a predetermined period of time (e.g., depending on the measure, such time periods can include: 1, 10, 30 seconds; 1, 5, 30 minutes; 1, 3, 8 hours; 1, 7, 30 days). As an example, each latency measurement and network usage measurement described above can be stored for each of these example historical time periods. When a latency threshold is reached/exceeded (e.g., for a predetermined period of time), the historical trends can be compared to determine whether to trigger a mitigation response and/or to determine an appropriate mitigation response.

Correlation of Historical Data and Latency Measurements

As also shown in FIG. 5, root cause analysis modules 430 for latency-based policy activation include one or more correlation rules 508 that can be applied by a correlation logic component 510 to determine whether a latency threshold is triggered and whether to perform a mitigation response based on a report/response policy 512. In one embodiment, correlation logic performs correlation of historical data with latency and/or network resource measurements.

In an example implementation, correlation ratios can be generated from the network and latency measurements to identify use patterns and reduce mitigation false positives. For example, trending of the correlation ratios allows normal versus abnormal use patterns to be automatically identified (e.g., without requiring a manual configuration or updating by an IT/network admin).

For example, latency correlation ratios can be associated with the service(s) the firewall is protecting. An enterprise (e.g., IT/network admin) can enable/disable the correlation metric. Example latency correlation ratios will now be described.

New requests to response latency is an example latency correlation ratio of connections and/or transactions requested mapped to the response latency. This example latency correlation ratio provides an understanding of how may requests can be received before the application slows down. Application requests can be defined by an App ID signature as similarly described above.

Application packet rate to response latency is another example latency correlation ratio of packet rates mapped to the response latency. This example latency correlation ratio provides an understanding of how many application packets are transmitted before the application slows down.

Application bandwidth (tx/rx) to response latency is another example latency correlation ratio of bandwidth to and from the application mapped to the response latency. This example latency correlation ratio provides an understanding of how much bandwidth volume is used before the application slows down.

Application correlation ratios can be used to trend application use and provide additional metrics for DoS mitigation/response policies. Example application correlation ratios will now be described.

Application new requests to clients is an example application correlation ratio that profiles client new requests (session/transaction) and helps identify abnormal use. For example, this application correlation ratio can identify a DDoS attack with botnet/compromised clients or an attack tool performing high numbers of queries. In some cases, this can be applied by the firewall to provide an app DoS profile to limit a client's max sessions/transactions.

Application sessions to clients is another example application correlation ratio that profiles client concurrent sessions and helps identify abnormal session use. For example, this application correlation ratio can identify a single client attacking a web server with many sessions.

Application source ports to clients is another example application correlation ratio that profiles client use of unique source ports and helps identify abnormal use patterns. For example, this application correlation ratio can identify a single client attacking a server with rotating UDP attack using a unique source port every predetermined number of packets (e.g., every 100 packets or some other number of packets).

Application receive (rx) to transmit (tx) bytes is another example application correlation ratio that profiles application bandwidth direction use and helps to identify abnormal behavior. For example, this application correlation ratio can identify a file download application DoS attack. In some cases, this can be applied by the firewall to allow an app DoS to limit file downloads. As such, this technique provides a granular response to a specific app DoS attack that existing firewall approaches to DoS cannot perform, as this technique facilitates an effective app DoS response to this targeted app DoS without impacting other, legitimate uses of the service by other users/customers.

Geo-location sessions to total sessions is another example application correlation ratio that profiles client access and helps identify abnormal access from specific geo-regions. In some cases, this can be applied by the firewall to provide an app DoS profile to be automatically generated to limit a geo-region.

As an example, using the monitored feedback, the firewall can limit only the connects that affect the latency to the protected application/service. For instance, if the download is at a high latency, the firewall can limit only connections going to a specific download site of the ACME Company web site, such as download.ACME.com. App signatures can be created to ID the specific functions of the web site, which can be related back to the CPS with the app signature match. This ensures that only the affected service is throttled, and the performance to all other areas of the web site is not impacted.

Logic Flow Overview of Latency-based DoS Protection

Figure 6:
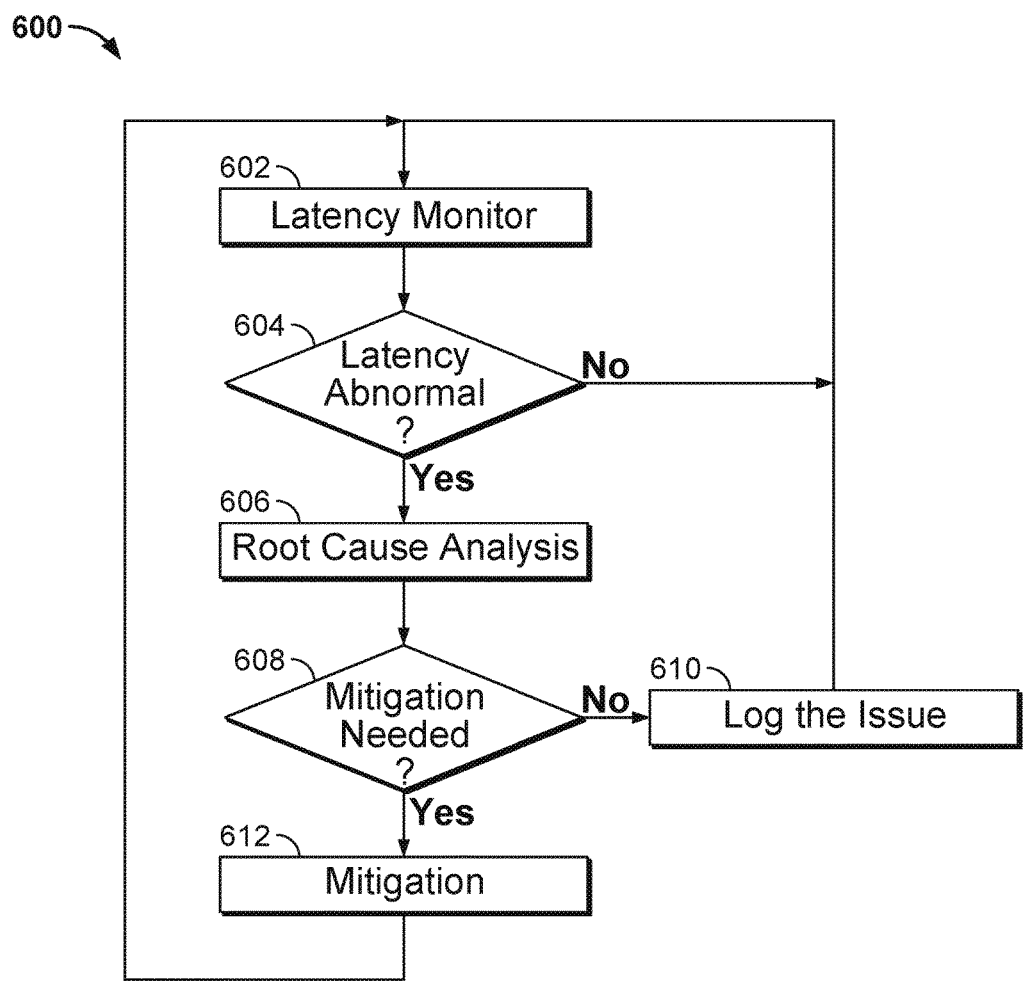
FIG. 6 is a flow diagram for performing latency-based DoS protection in accordance with some embodiments.

FIG. 6 is a flow diagram for performing latency-based DoS protection in accordance with some embodiments. In various embodiments, a process 600 as shown in FIG. 6 is performed by the data appliance (e.g., network device/firewall) as similarly described above with respect to FIGS. 1-5.

At 602, latency is monitored at a network device. For example, various latency measures for a protected application/service can be monitored as similarly described above with respect to FIG. 5. Also, various network resources associated with the protected application/service can also be monitored as similarly described above with respect to FIG. 5.

At 604, whether the latency is abnormal is determined. For example, the monitored latency can be compared to a behavior profile to determine whether the latency is normal or abnormal based on historical trends as similarly described above with respect to FIG. 5. If not (e.g., latency determined to be normal), then processing can return to 602 as shown. Otherwise (e.g., latency determined to be abnormal), processing continues to 606 as shown.

At 606, root cause analysis is performed. For example, root cause analysis can be performed using root cause analysis modules and correlation techniques as similarly described above with respect to FIG. 5.

At 608, whether a mitigation response is to be performed is determined. If not, then processing proceeds to 610 at which the issue is logged. Otherwise (e.g., mitigation response is to be performed), processing continues to 612 as shown.

At 612, a mitigation response is performed. For example, various mitigation responses can be performed as similarly described above (e.g., throttling connections, denying new connections, dropping existing sessions, and/or other responses can be performed). Processing can then return to 602 as shown. In some cases, if latency measures return to normal/drop below latency thresholds for a predetermined period of time, then the mitigation responses can be reduced or terminated.

Figure 7:
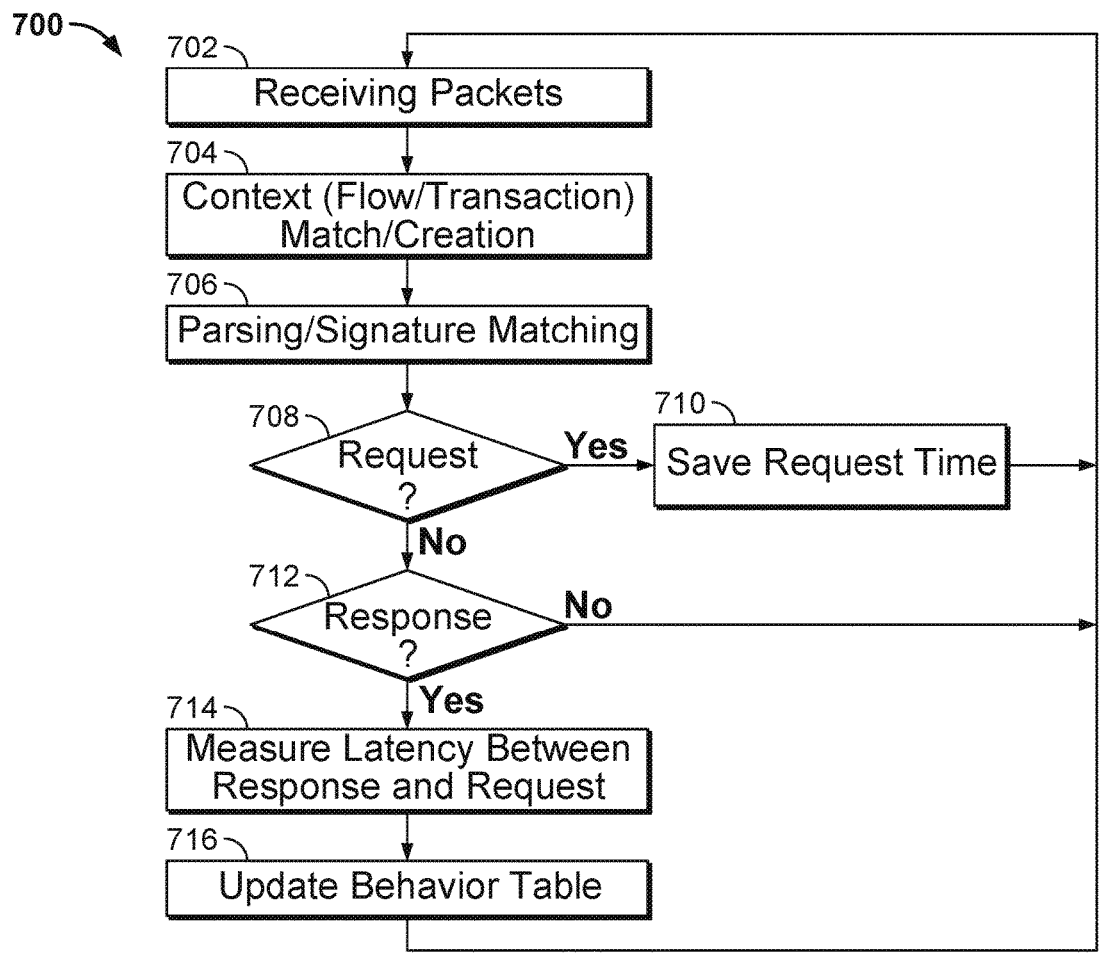
FIG. 7 is a flow diagram of a latency module for performing latency-based DoS protection in accordance with some embodiments.

Logic Flow Overview of a Latency Module for Performing Latency-based DoS Protection FIG. 7 is a flow diagram of a latency module for performing latency-based DoS protection in accordance with some embodiments. In various embodiments, a process 700 as shown in FIG. 7 is performed by the data appliance (e.g., network device/firewall) as similarly described above with respect to FIGS. 1-5.

At 702, packets are received at a network device. For example, packets can be received by a network device 202 as similarly described above.

At 704, context (e.g., flow/transaction) match/creation is determined for the received packets, such as similarly described above with respect to FIG. 1.

At 706, parsing/signature matching is performed, such as similarly described above with respect to FIG. 1.

At 708, whether a request packet is received is determined. If so (e.g., a request packet was received), then processing proceeds to 710 at which the request time is saved (e.g., cached). Otherwise (e.g., a request packet was not received), processing continues to 712 as shown.

At 712, whether a response packet is received is determined. If not (e.g., a response packet was not received), then processing returns to 702 as shown. Otherwise (e.g., a response packet was received), processing continues to 714 as shown.

At 714, a latency measure between the response packet and the request packet is determined. For example, the latency measure can be calculated based on the request time and the response time recorded for the received request packet and the received response packet.

At 716, a behavior table is updated to record the latency measure. For example, the behavior table can be updated to cache the calculated latency measure as similarly described above with respect to FIG. 5. Processing can then return to 702 as shown.

Figure 8:
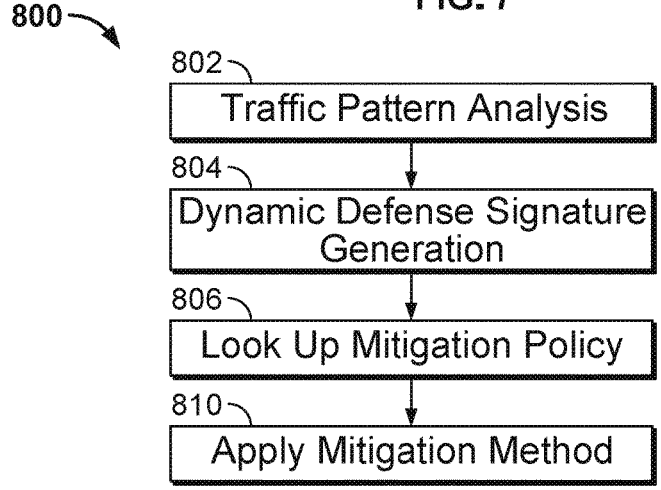
FIG. 8 is a flow diagram of a mitigation module for performing latency-based DoS protection in accordance with some embodiments.

Logic Flow Overview of a Mitigation Module for Performing Latency-based DoS Protection FIG. 8 is a flow diagram of a mitigation module for performing latency-based DoS protection in accordance with some embodiments. In various embodiments, a process 800 as shown in FIG. 8 is performed by the data appliance (e.g., network device/firewall) as similarly described above with respect to FIGS. 1-5.

At 802, a traffic pattern analysis is determined at a network device. For example, the traffic pattern analysis can be determined as similarly described above with respect to FIG. 5. As similarly discussed above, the disclosed traffic pattern analysis performed by the network device can provide for a more granular latency and additional network usage parameters measured to identify the offending traffic.

At 804, dynamic defense signature generation is performed based on the traffic pattern analysis. For example, a defense signature can be automatically and dynamically generated to identify the offending traffic (e.g., based on historical trends analysis for a protection application/server), such as similarly described above with respect to FIG. 5. As such, the disclosed techniques can be applied to dynamically generate protection signatures to protect the host, service, or network based on the data collection and analysis as disclosed here.

At 806, a mitigation policy look-up is performed. For example, a mitigation policy can be retrieved for a given latency threshold trigger (e.g., look up user defined mitigation policy to find the next applicable mitigation method), such as similarly described above with respect to FIG. 5.

At 808, a mitigation method is applied. For example, a mitigation method can be applied by a network device/firewall (e.g., the selected mitigation method can be applied against the offending traffic identified by the dynamic defense signature), such as similarly described above with respect to FIGS. 1-5.

Overview of an Interface of a Network Device for Providing Latency-based Policy Activation In one embodiment, a user interface (e.g., a graphical user interface (GUI) and/or other user interface designs/mechanisms) is provided for a network device that provides latency-based policy activation. Below is an example implementation of a user interface, including various example screen shots as shown in FIGS. 9-17, of a network device that provides latency-based policy activation (e.g., a network device that implements a firewall that can provide latency-based policy activation as disclosed herein with respect to various embodiments).

Initially, a user (e.g., IT/network admin or other authorized user) defines a latency policy (e.g., latency profiles are used in latency policies) to monitor critical resources and/or applications on a protected enterprise network. If latency is above a threshold defined in the latency policy (e.g., in a latency policy's protect tab, such as further described below), then the following can be performed. Correlation rules specified in the protect tab are analyzed to isolate root cause and reduce false positive(s). Both And and Or correlation conditions are weighed for a match. If a match is found in the correlation rules, then the behavioral table (e.g., behavioral table 506) is referenced for root cause isolation. In an example implementation, the behavioral table includes history information for normal and peak utilization (e.g., aggregate and/or per client).

For example, latency correlation can show one or more of the following: new requests to response latency ratio is very high (e.g., which can indicate that server(s) are not responding within normal—peak ratios, and/or that the back-end is not keeping up with new requests); packet rate to response latency is out of normal range (e.g., which shows that server(s) are not responding at the same normal ratio even with new virtual machines (VMs) being spun up to absorb additional load); bandwidth to response latency is not normal (e.g., which can show that bandwidth has barely increased, but latency is much higher; and/or this can show that the application is not being used normally); and ping monitoring to the server shows that the network latency of the path is not abnormally high (e.g., which indicates that the probable cause is not network related).

For example, network correlation can show one or more of the following: new requests to client is above a normal correlation ratio (e.g., which can indicate that client use patterns are not normal); application sessions to client is above normal (e.g., shows 50 out of 850 total source IP addresses generating 80% of total sessions); receive (rx) bytes to transmit (tx) bytes is outside a normal correlation ratio (e.g., rx is much higher than tx traffic can indicate that application is responding abnormally to requests); and geolocation to total sessions is above normal (e.g., shows a 150 times normal session load for a region the customer does not do business in).

In this example implementation, the monitored latency behavior can be compared with a behavior table (e.g., behavior table 506, such as similarly described above with respect to FIG. 5). Based on a comparison with the behavioral table, whether the monitored latency behavior indicates abnormal behavior can be determined. In some cases, weighting for each correlation ratio can be implemented to provide as input into a decision engine (e.g., correlation logic 510). Based on decision outcome, the latency correlation/policy logic (e.g., correlation logic 510) can determine that mitigation action is warranted and activates mitigation action(s) selected/configured by the user. In some cases, mitigation can be enforced for both new sessions and existing sessions to protect the server resources. For example, a protect action can be selected for particular latency policy states to perform random early drop mitigation on new sessions. Existing sessions that are above the historical peaks are instructed to "reset both" to kill the sessions on both client and server. For repeat offenders that keep surpassing the thresholds, the action can allow the offender to be blocked for a specified amount of time.

After latency profiles are defined, a user (e.g., IT/network admin or other authorized user) can define latency policy rules. In this example, latency profiles are used in latency policies. Latency policy rules can be used to specify a context for latency policy match, such as with respect to one or more of the following context criteria: a source, a destination, an application, and protection. This provides a high level of granularity to allow a user (e.g., IT/network admin or other authorized user) to safeguard specific resources using latency policies.

Policies allow a user (e.g., IT/network admin or other authorized user) to specify the applications to be monitored in addition to the source/destination or other context. The above-described App ID capabilities can also be leveraged to identify the application. In addition, a user (e.g., IT/network admin or other authorized user) can customize the application objects to look for specific functions within an application to safeguard against application DDoS attacks (e.g., an HTTP GET request and/or other specific functions as similarly described above with respect to FIG. 5).

Policies can also leverage the actions defined in the latency profiles to mitigate abusive activity. As similarly described above, the disclosed techniques can dynamically enable a mitigation action as determined by the latency threshold(s) and the decision engine (e.g., correlation logic 510). Mitigation can also be dynamically disabled when the symptoms of the attack are reduced for a specified amount of time (e.g., the triggering latency measure falls below the latency threshold for a predetermined period of time, as similarly described above). This creates a self-defending architecture for responding to and mitigating against various types/forms of DoS attacks against protected applications/servers.

Mitigation policies can include any or all of the following example mitigation responses (e.g., these are examples of mitigation responses, such can include any response that can be implemented using a network device and/or a firewall implemented on the network device, and is extensible). Flood protection from zone and/or DoS profiles can be performed as a mitigation response to block out flood attacks causing latency. Geo-region source IP objects can be implemented in DoS or App DoS policies as a mitigation response to reduce attack from low priority regions. App DoS signatures can be implemented as a mitigation response to reduce connections, sessions, and transactions against an overloaded service. Additional security profiles can be layered in addition to DoS policies as a mitigation response to block offending sources if flood protection is overrun. For example, bad IP addresses can be quarantined for a specified amount of time as a mitigation response. As another example, PPS (e.g., when available) can be used to reduce traffic loads from classified sources or to the destination service as a mitigation response. As yet another example, max connections can be used to limit traffic loads from classified sources or to the destination service as a mitigation response. As yet another example, the network device can also be configured to automatically communicate with another/external network device (e.g., another security device/network gateway firewall or network gateway firewall manager) to mitigate ahead of the firewall or to redirect the offending traffic flow to another destination for analysis or mitigation.

Latency Protection Tab of a Latency Profile

In one embodiment, a DoS profile of an interface of a firewall/network device (e.g., data appliance 202) includes a latency protection tab for a latency profile. For example, the latency protection tab can include the following configuration tabs: a latency tab (e.g., as shown in FIG. 9) that allows a user to select the latency monitoring and correlation types; a network tab (e.g., as shown in FIG. 10) that allows a user to select the network monitoring and correlation types; and a protect tab (e.g., as shown in FIG. 11) that allows a user to set the thresholds and the correlation ratio ranges, as will now be further described below.

Latency Tab of a Latency Profile

Figure 9:
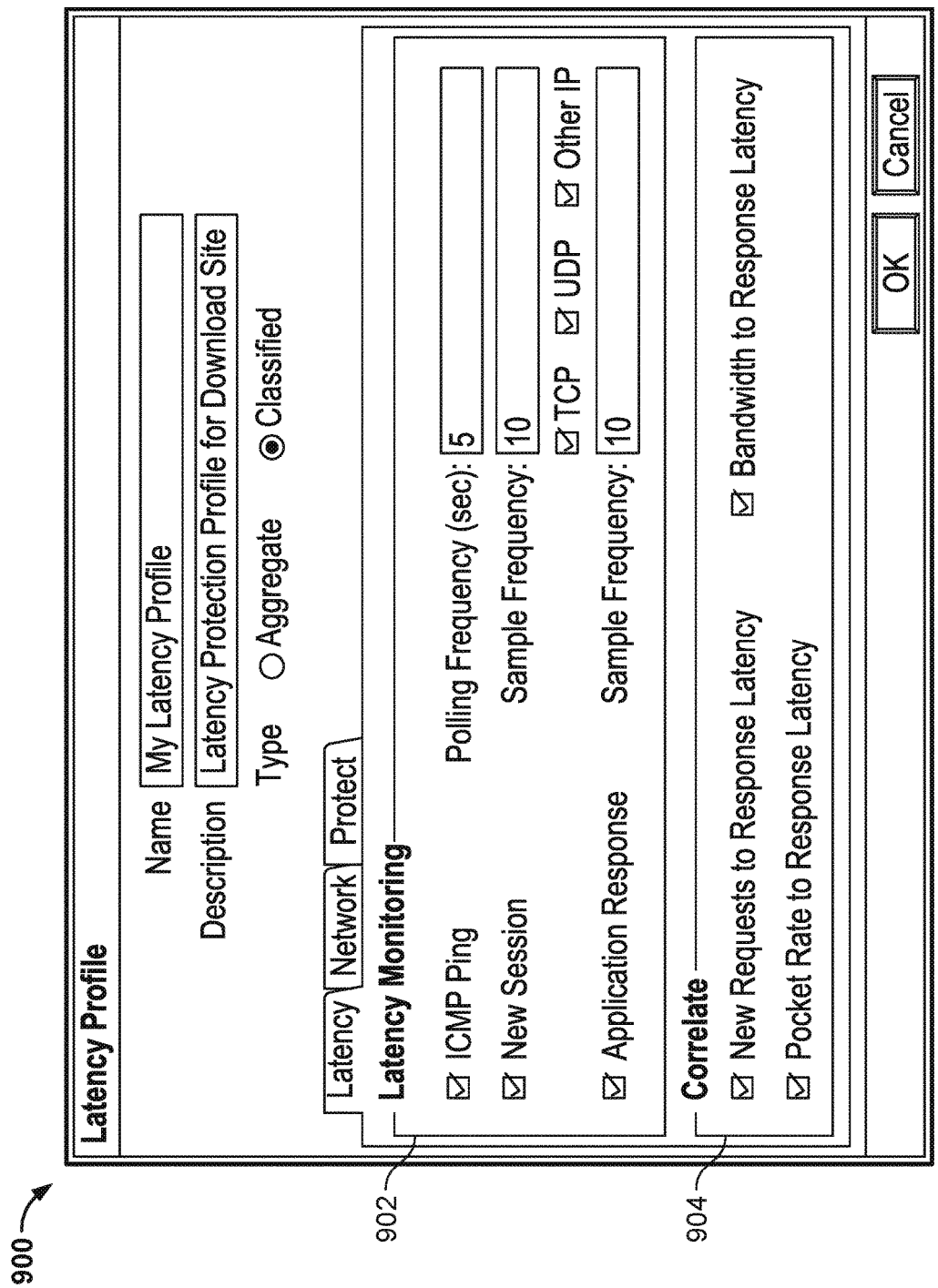
FIG. 9 is a diagram illustrating a screen shot of an interface for providing latency-based policy activation in accordance with some embodiments.
Figure 10:
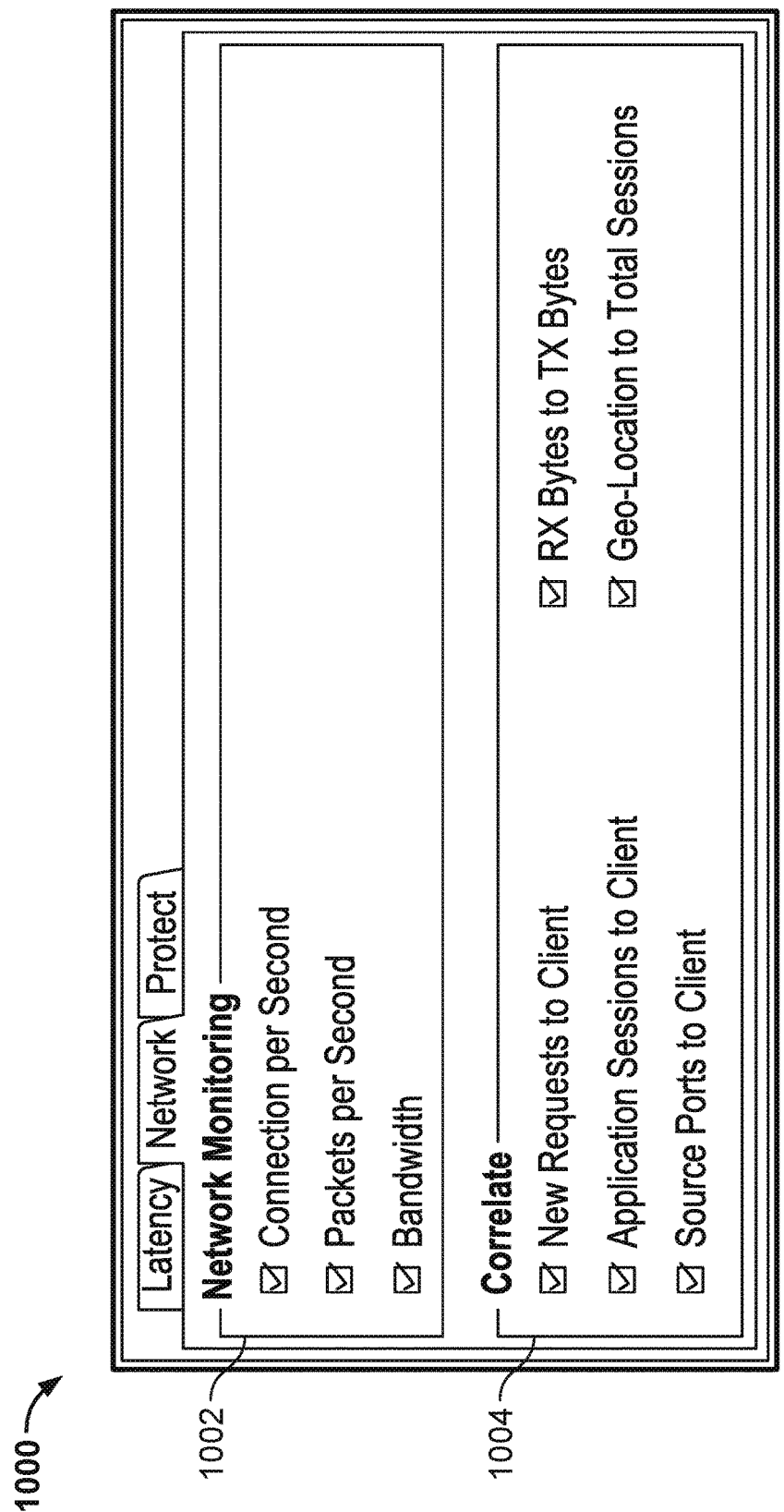
FIG. 10 is another diagram illustrating a screen shot of an interface for providing latency-based policy activation in accordance with some embodiments.

FIG. 9 is a diagram illustrating a screen shot of an interface for providing latency-based policy activation in accordance with some embodiments. As shown, a screen shot 900 of a latency tab of a latency profile is provided.

In one embodiment, the latency tab of the latency profile allows a user to select the latency measurements to use to monitor the service or application defined in the DoS policy as shown at 902. As shown, ICMP ping can be selected to enable ICMP ping latency monitoring (e.g., pings from the firewall's egress interface; IP address can be specified in the DoS rule's destination tab; and polling frequency (sec) can be input to configure the frequency to ping the IP address). As also shown, a new session can be selected to enable new connection latency monitoring for TCP and UDP (e.g., a sample frequency can be input to configure the frequency that new sessions are sampled; for example, 10 means every 10th new connection, and connection direction can be specified in the DoS rule's source and destination tabs). As also shown, an application response can be selected to enable existing session latency monitoring (e.g., a sample frequency can be input to configure the frequency that packets are sampled; for example, 10 means every 10th transaction of an existing HTTP session's GET and its response).

In one embodiment, the latency tab of the latency profile also allows a user to select the correlations to perform as shown at 904. As shown, this correlate interface allows a user to select the correlation monitoring types to use including the following: requests to latency (e.g., enables CPS requests to latency ratio tracking); packet rate to latency (e.g., enables PPS rate to latency ratio tracking); and bandwidth to latency (e.g., enables bandwidth to latency ratio tracking). In an example implementation, by default, all correlation checkboxes can be enabled (e.g., this allows a user to easily setup the DoS rule to alert to start monitoring the activity and building historical information). In this example, disabled correlation types will result in the corresponding correlation rule match context being grayed out (e.g., as no data is collected).

Network Tab of a Latency Profile

FIG. 10 is another diagram illustrating a screen shot of an interface for providing latency-based policy activation in accordance with some embodiments. As shown, a screen shot 1000 of a network tab of a latency profile is provided.

In one embodiment, the network tab of the latency profile allows a user to select the network monitoring types for monitoring the service as shown at 1002. As shown, connections per second can be selected to enable CPS monitoring for the service. As also shown, packets per second can be selected to enable PPS monitoring for the service. As also shown, bandwidth can be selected to enable bandwidth monitoring for the service.

In one embodiment, the network tab of the latency profile also allows a user to select the correlations to perform as shown at 1004. As shown, this correlate interface allows a user to select the correlation types to use with network monitoring types including the following: new requests to client (e.g., enables the CPS requests to unique source IP address ratio tracking); application sessions to client (e.g., enables the concurrent session to unique source IP address ratio tracking); source ports to client (e.g., enables the source port to unique source IP address ratio tracking); receive (rx) Bytes to transmit (tx) bytes (e.g., enables the application's rx to tx byte ratio tracking); and geo-location to total sessions (e.g., enables the geo-location sessions to total session ratio tracking). In an example implementation, by default, all correlation checkboxes are enabled (e.g., this allows the user to easily setup the DoS rule to alert to start monitoring the activity and building historical information). In this example, disabled correlation types will result in the corresponding correlation rule match context being grayed out (e.g., as no data is collected).

Protect Tab of a Latency Profile

FIG. 11 is another diagram illustrating a screen shot of an interface for providing latency-based policy activation in accordance with some embodiments. As shown, a screen shot 1100 of a protect tab of a latency profile is provided.

In one embodiment, the protect tab allows the user to define the latency thresholds for new connections and existing connections as shown at 1102. For example, the thresholds interface shown at 1102 allows a user to specify the threshold values and the duration that the threshold has to exceed the threshold value before a latency threshold trigger is satisfied/met. As shown, a maximum (max) new session latency can be configured to specify the latency for new connections (e.g., alert, activate, and maximum thresholds are permitted for configuration in milliseconds (ms); and default values are not provided in a new profile in this example implementation).

As also shown, a max application latency can be configured to specify the latency for existing sessions' flows (e.g., alert, activate, and maximum thresholds are permitted for configuration in ms; default values are not provided in a new profile in this example implementation; and threshold duration (ms) can be configured to specify the time excessive latency must last before a trigger is encountered).

As also shown, an action allows the user to select how to mitigate the offending traffic. Example actions can include one or more of the following: alert (e.g., sends an alert using current mechanisms); random early drop (RED) (e.g., RED drops packets starting at activate threshold; when max threshold is reached, all packets are dropped); block IP (e.g., blocks source IP address for specified duration—quarantines IP; if block IP is selected, allow a duration to be set; defaults to 300 seconds in this example implementation); reset client (e.g., sends reset to client side device); reset server (e.g., sends reset to server side device); reset both client and server (e.g., sends reset to both client and server devices); none (e.g., no action is performed, which can be used with policy's monitor action to allow silent monitoring as a learning mode for learning historical values for new behavior profile generation as similarly described above); and/or other actions.

In this example implementation, protection begins after the latency threshold surpasses the configured duration time. For example, alert when server latency is greater than 1000 ms for 10 seconds can be set. Enable protection when latency is greater than 1500 ms for more than 30 seconds can be set.

As also shown, a repeat offenders interface can be configured to keep track of source IP addresses that have surpassed the thresholds and tracks the frequency of such offenses. When the number of offenses surpasses the specified threshold, the IP can be blocked (e.g., quarantined) for the specified amount of time. This allows a user to select a different action in the new and existing sessions and only perform a more drastic quarantine action when the offense is repetitive. As such, this can help to reduce false positive quarantining where a legitimate source IP can be blocked for a duration of time.

In one embodiment, the protect tab also allows a user to define the correlation rules applied after a latency threshold is triggered as shown at 1104. In this example implementation, correlation incudes analyzing other factors to reduce potential false positives/negatives as similarly described above.

FIG. 12 is another diagram illustrating a screen shot of an interface for providing latency-based policy activation in accordance with some embodiments. As shown, a screen shot 1200 of a condition configuration interface is provided.

In one embodiment, the condition configuration interface allows the user to define a context for additional factors that are to be analyzed and correlated as shown at 1202 (e.g., contexts displayed can depend on the correlation types enabled for the latency profile). For example, correlation rules allow the user to specify the correlation checks that will be performed when the latency trigger is reached in order to reduce potential false positives/negatives as similarly described above.

In this example implementation, correlation rules follow a signature context creation process (e.g., can be added as AND/OR conditions; and a user can select an ordered condition match to match in a top down fashion). Context can be configured using a dropdown list that shows the available correlation ratios to select from as shown in FIG. 12. Operator can be configured using a less than, equal to, or greater than selection. Value can be configured for the context selected.

Example Latency Protection Policy Requirements

In one embodiment, a new type of policy is added to the firewall's policy tab called "latency protection." For example, the latency protection menu item can be located in a DoS protection menu of an interface for the network device/firewall.

FIG. 13 is another diagram illustrating a screen shot of an interface for providing latency-based policy activation in accordance with some embodiments. As shown, a screen shot 1300 of an application tab of a latency policy rule is provided.

In one embodiment, the latency policy rule tab includes the following as shown in FIG. 13: general, source, destination, application, and protection. For example, the general, source, and destination tabs can parallel the DoS policy to allow granular classification of source/destination.

In one embodiment, the application tab of the latency policy rule is provided as shown at 1302. In this example implementation, the application tab allows customers to create custom application signatures for monitoring and protection (e.g., if multiple applications are listed, the different applications can be separately monitored/protected using the same profile criteria), such as similarly described above. For example, the URL string for the ACME company's download site can be configured as a custom application signature (e.g., application can be optional and ANY can be specified as a valid option as the destination address can be used to identify the target server to protect; and if more than one app signature is specified, the profile selected is used to monitor each one separately, that is, the latency from all applications is not cumulative).

Figure 14:
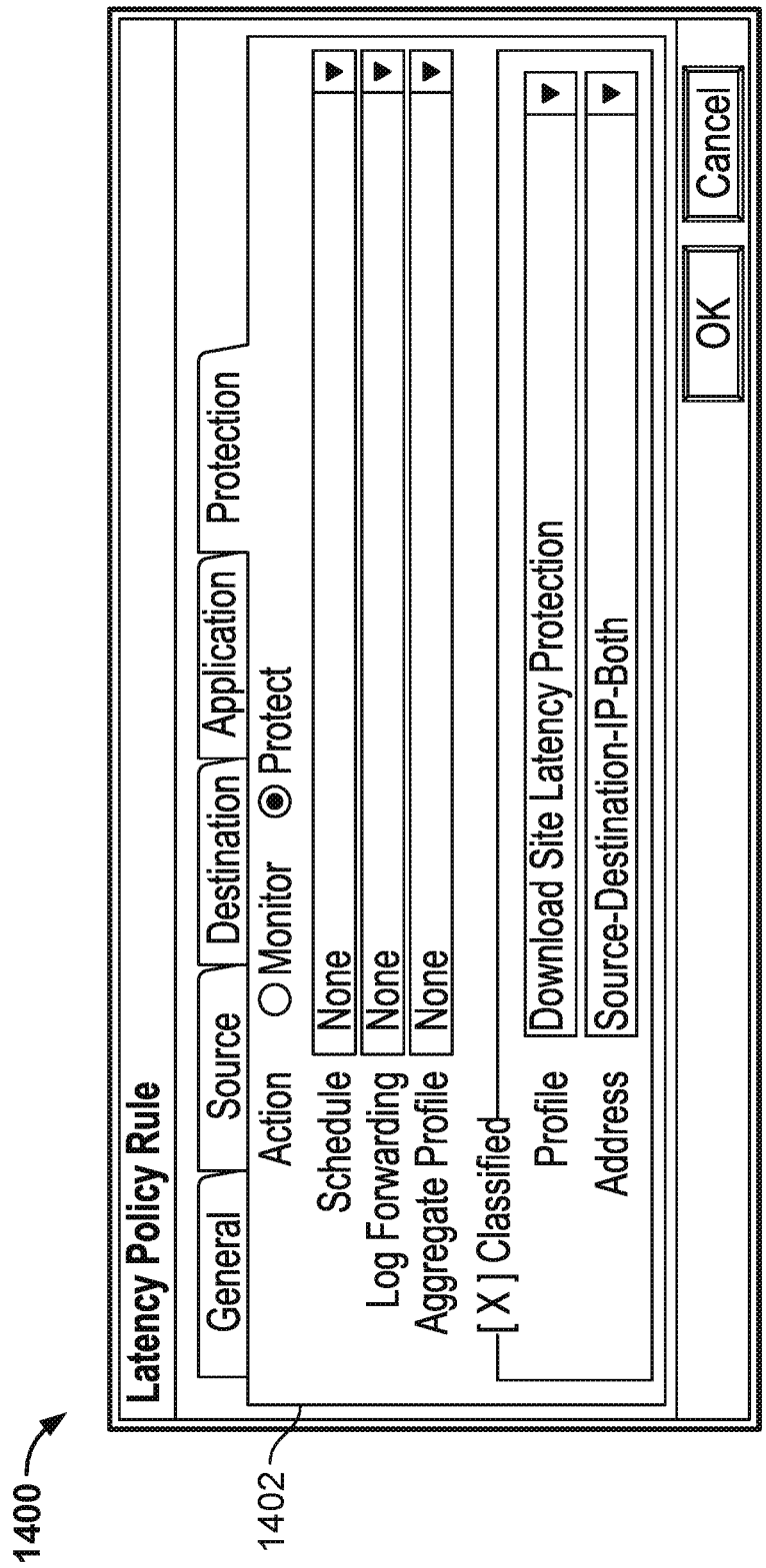
FIG. 14 is another diagram illustrating a screen shot of an interface for providing latency-based policy activation in accordance with some embodiments.

FIG. 14 is another diagram illustrating a screen shot of an interface for providing latency-based policy activation in accordance with some embodiments. As shown, a screen shot 1400 of a protection tab of a latency policy rule is provided.

In one embodiment, the protection tab of the latency policy rule is provided as shown at 1402. In this example implementation, the protection tab provides the different actions that can be performed along with the traditional schedule, logging, and classification settings.

As shown, an action includes the following options: monitor (e.g., uses the latency profile's latency, network, and correlation settings to monitor service; no action is taken when thresholds are met); and protect (e.g., uses the latency profile's thresholds and action settings to protect the service).

In this example implementation, profiles can be either aggregate or classified as also shown in FIG. 14. Aggregate measures latency, network, and correlation using only the destination specified. Classified measures latency, network, and correlation using src-ip-only, dst-ip-only, or src-dst-ip-both.

Viewing Collected Latency Statistics

Figure 15:
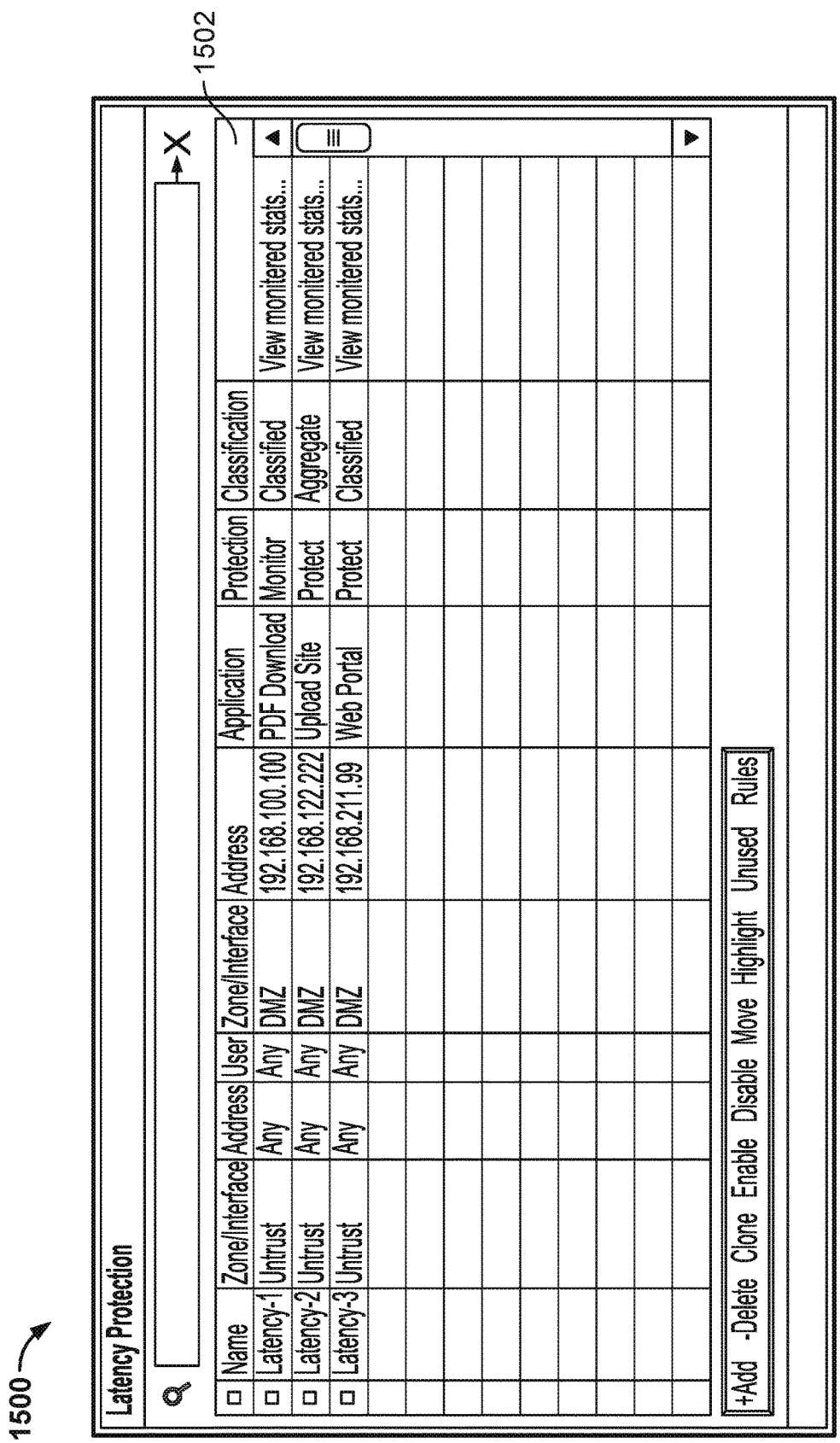
FIG. 15 is another diagram illustrating a screen shot of an interface for providing latency-based policy activation in accordance with some embodiments.

FIG. 15 is another diagram illustrating a screen shot of an interface for providing latency-based policy activation in accordance with some embodiments. As shown, a screen shot 1500 of latency protection statistics is provided. For example, the monitored latency data and statistics associated with the monitored latency data can be stored locally on a data appliance (e.g., using a cache 422 or other cache/data store in management plane 402).

For example, being able to properly set the starting values for thresholds and correlation rules can be critical as many customers have expressed frustration with solutions that do not provide adequate historical statistics for this purpose. As such, in one embodiment, the latency protection interface also provides an interface/screen for a user to view (e.g., and drill down on) the collected statistics from a policy's Monitor action via a "View monitored statistics" option of the Latency Protection screen as shown at 1502.

Figure 16:
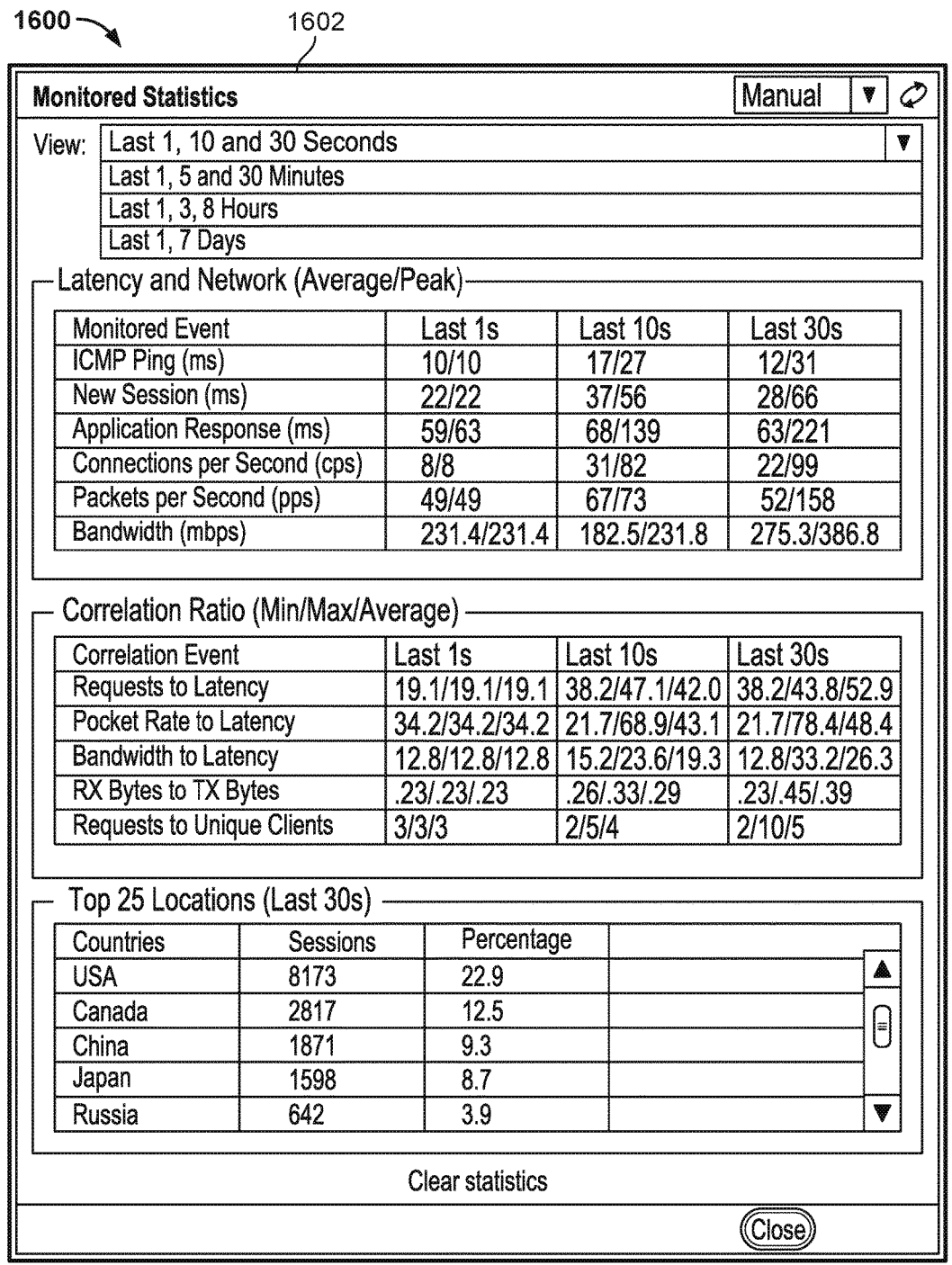
FIG. 16 is another diagram illustrating a screen shot of an interface for providing latency-based policy activation in accordance with some embodiments.

FIG. 16 is another diagram illustrating a screen shot of an interface for providing latency-based policy activation in accordance with some embodiments. As shown, a screen shot 1600 of monitored latency protection statistics is provided.

In one embodiment, when the "View monitored statistics . . ." is selected (e.g., such as shown in FIG. 15), a monitored statistics window is displayed as shown at 1602. In an example implementation, the monitored statistics window allows a user to refresh the screen manually or with predefined time periods (e.g., 10, 30, 60 seconds, and/or manual, such as by allowing the user to select the time duration to view with a dropdown list as shown: last 1, 10, and 30 seconds; last 1, 5, and 30 minutes; last 1, 3, 8 hours; and last 1, 7 days; and/or other time durations can be selected/shown). Also, for the time duration selected, the following statistics are displayed: latency and network statistics displays average/peak values; correlation ratio displays minimum/maximum/average values; top 25 locations displays the top 25 geo-regions' sessions and their percentage of total sessions for the highest time duration.

Example Reporting Requirements

Figure 17:
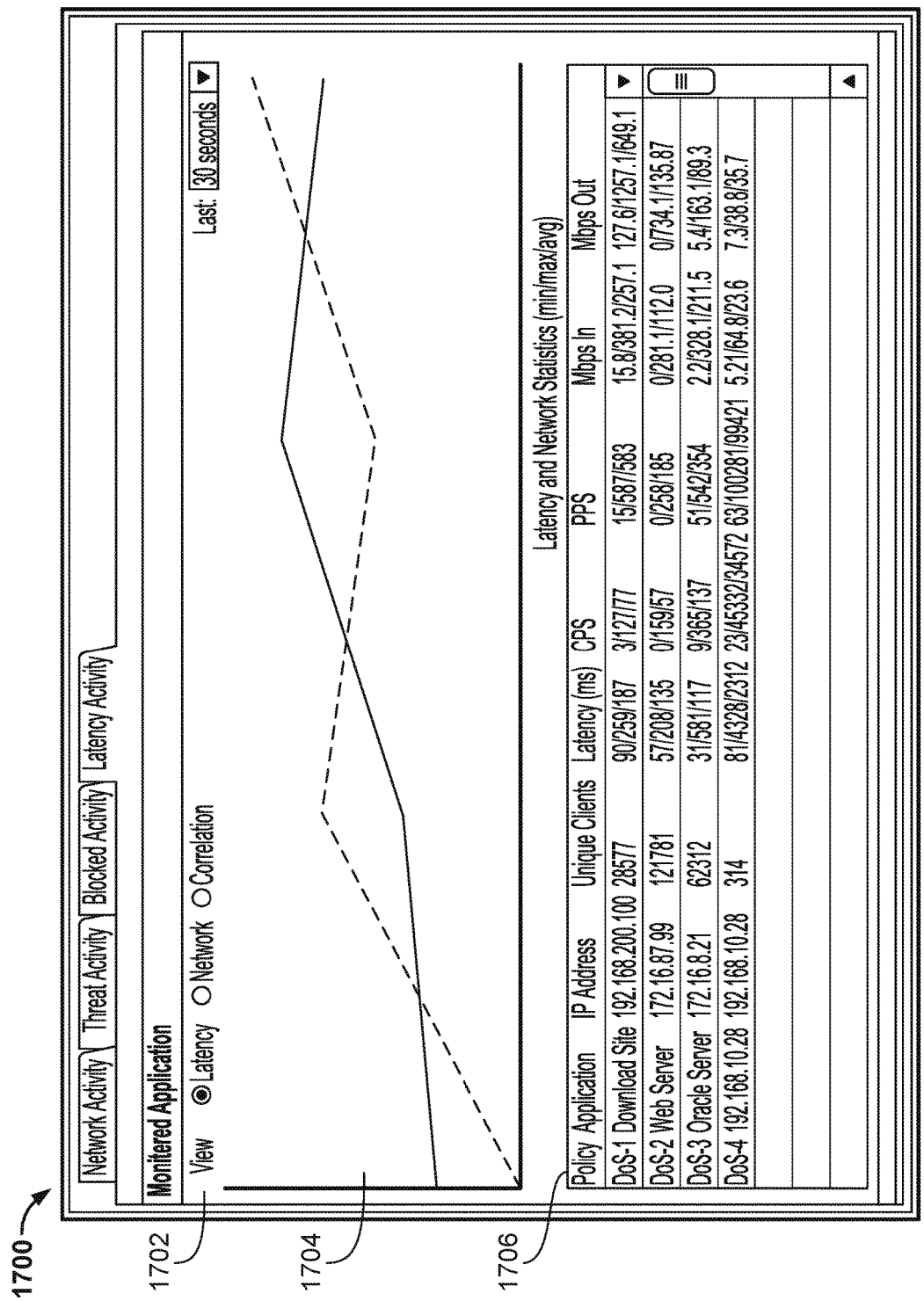
FIG. 17 is another diagram illustrating a screen shot of an interface for providing latency-based policy activation in accordance with some embodiments.

FIG. 17 is another diagram illustrating a screen shot of an interface for providing latency-based policy activation in accordance with some embodiments. As shown, a screen shot 1700 of a latency activity tab is provided.

In one embodiment, a user can select various statistics to graph based on monitored network related data by selecting radio buttons as shown at 1702, such as the following: latency statistics, network statistics, and/or correlation statistics. Specifically, the graphed statistics/data can show the application latency, networking, and correlation ratios for each protected application/service (e.g., showing a last reading and historic views based on last N time; showing minimum, peak, and average values for each historic time slot; latency shows all latency measurements; network shows all network measurements; and correlation shows correlation ratio measurements). For example, the graphed statistics/data can show minimum/maximum/average latency for an application/service selected and time duration selected, such as shown at 1704 (e.g., integrated as part of the latency activity tab as shown in this example). Also, a table is provided as shown at 1706 that lists the DoS policies that have a latency profile configured for a specific application/IP address to monitor. For example, the DoS policies can be stored locally on a data appliance (e.g., in policies 420 or other data store in management plane 402).

Processes for Providing Latency-based Policy Activation Using a Network Device

Figure 18:
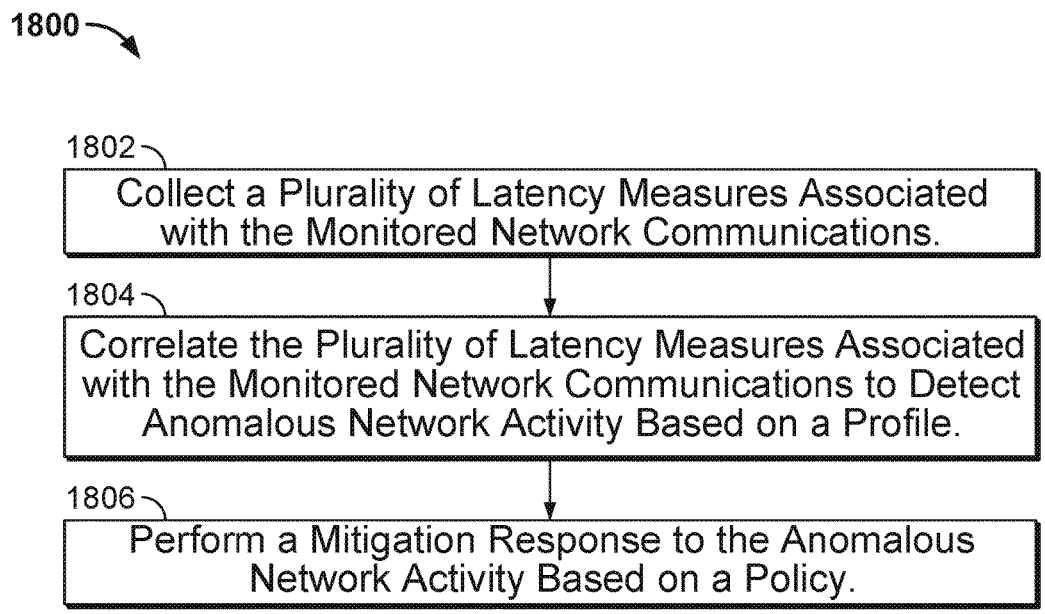
FIG. 18 is a flow diagram for performing latency-based policy activation in accordance with some embodiments.

FIG. 18 is a flow diagram for latency-based policy activation in accordance with some embodiments. In various embodiments, the process 1800 shown in FIG. 18 is performed by the data appliance (e.g., network device/firewall) as similarly described above with respect to FIGS. 1-5.

At 1802, a plurality of latency measures associated with the monitored network communications is collected. For example, network traffic can be monitored at a network device/firewall, such as data appliance 202 as shown in FIG. 2 and various latency measures can be collected (e.g., collected, received, calculated, measured, etc.) as similarly described above. Also, various network resource usage measurements can be collected by data appliance 202 by communicating with agents deployed on protected servers/network devices as also similarly described above.

At 1804, correlating the plurality of latency measures associated with the monitored network communications is performed to detect anomalous network activity based on a profile. For example, one or more of the latency measures can be correlated (e.g., including using one or more network resource usage measurements) to detect illegitimate network activity/demand on a protected application/service based on a profile for the protected application/service, such as similarly described above with respect to FIG. 5.

At 1806, a mitigation response to the anomalous network activity based on a policy is performed. For example, various mitigation responses can be performed for the protected application/service based on a DoS policy, such as similarly described above with respect to various embodiments. Example mitigation action(s) can include one or more of the following: throttling the network traffic, blocking the network traffic, generating an alert, logging the network activity, communicating the increase in demand for the application/service to a network device/firewall manager and/or to a cloud security service, and/or some other responsive action(s) can be performed based on the DoS policy.

Figure 19:
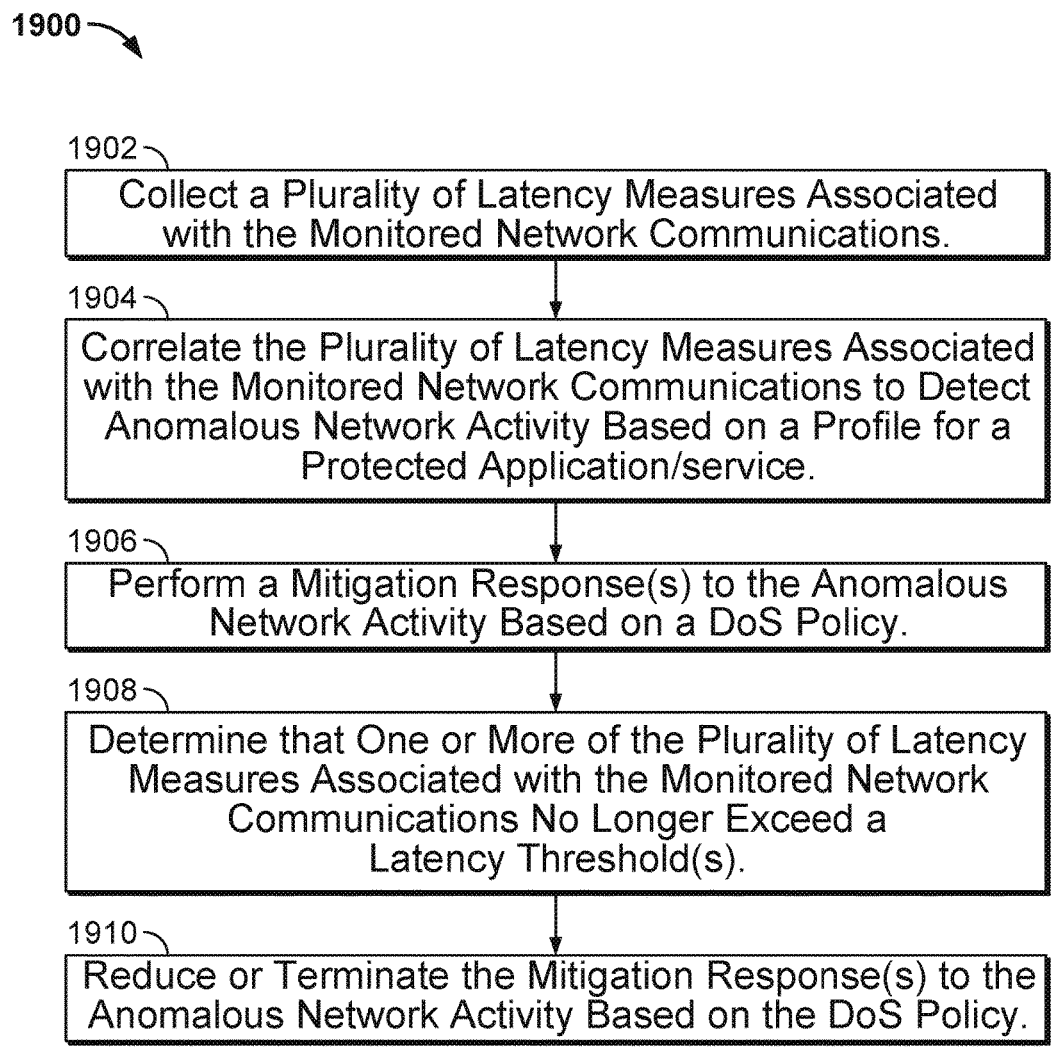
FIG. 19 is another flow diagram for performing latency-based policy activation in accordance with some embodiments.

FIG. 19 is another flow diagram for latency-based policy activation in accordance with some embodiments. In various embodiments, the process 1900 shown in FIG. 19 is performed by the data appliance (e.g., network device/firewall) as similarly described above with respect to FIGS. 1-5.

At 1902, a plurality of latency measures associated with the monitored network communications is collected. For example, network traffic can be monitored at a network device/firewall, such as data appliance 202 as shown in FIG. 2 and various latency measures can be collected (e.g., collected, received, calculated, measured, etc.) as similarly described above. Also, various network resource usage measurements can be collected by data appliance 202 by communicating with agents deployed on protected servers/network devices as also similarly described above.

At 1904, correlating the plurality of latency measures associated with the monitored network communications is performed to detect anomalous network activity based on a DoS profile for a protected application/service. For example, one or more of the latency measures can be correlated (e.g., including using one or more network resource usage measurements) to detect illegitimate network activity/demand on a protected application/service based on a profile for the protected application/service, such as similarly described above with respect to FIG. 5.

At 1906, a mitigation response to the anomalous network activity based on a DoS policy is performed. For example, various mitigation responses can be performed for the protected application/service based on a DoS policy if a given latency threshold(s) is exceeded for a predetermined period of time (e.g., a configured duration based on the DoS policy, in which the latency threshold(s) can be configured or adaptively tuned using various disclosed techniques), such as similarly described above with respect to various embodiments.

At 1908, determining that one or more of the plurality of latency measures associated with the monitored network communications no longer exceed a latency threshold(s) is performed.

At 1910, the mitigation response(s) to the anomalous network activity based on the DoS policy is reduced or terminated. For example, if a given latency threshold(s) is no longer exceeded for a predetermined period of time (e.g., a configured duration based on the DoS policy), then a throttling response can be reduced or terminated, such as similarly described above.

Figure 20:
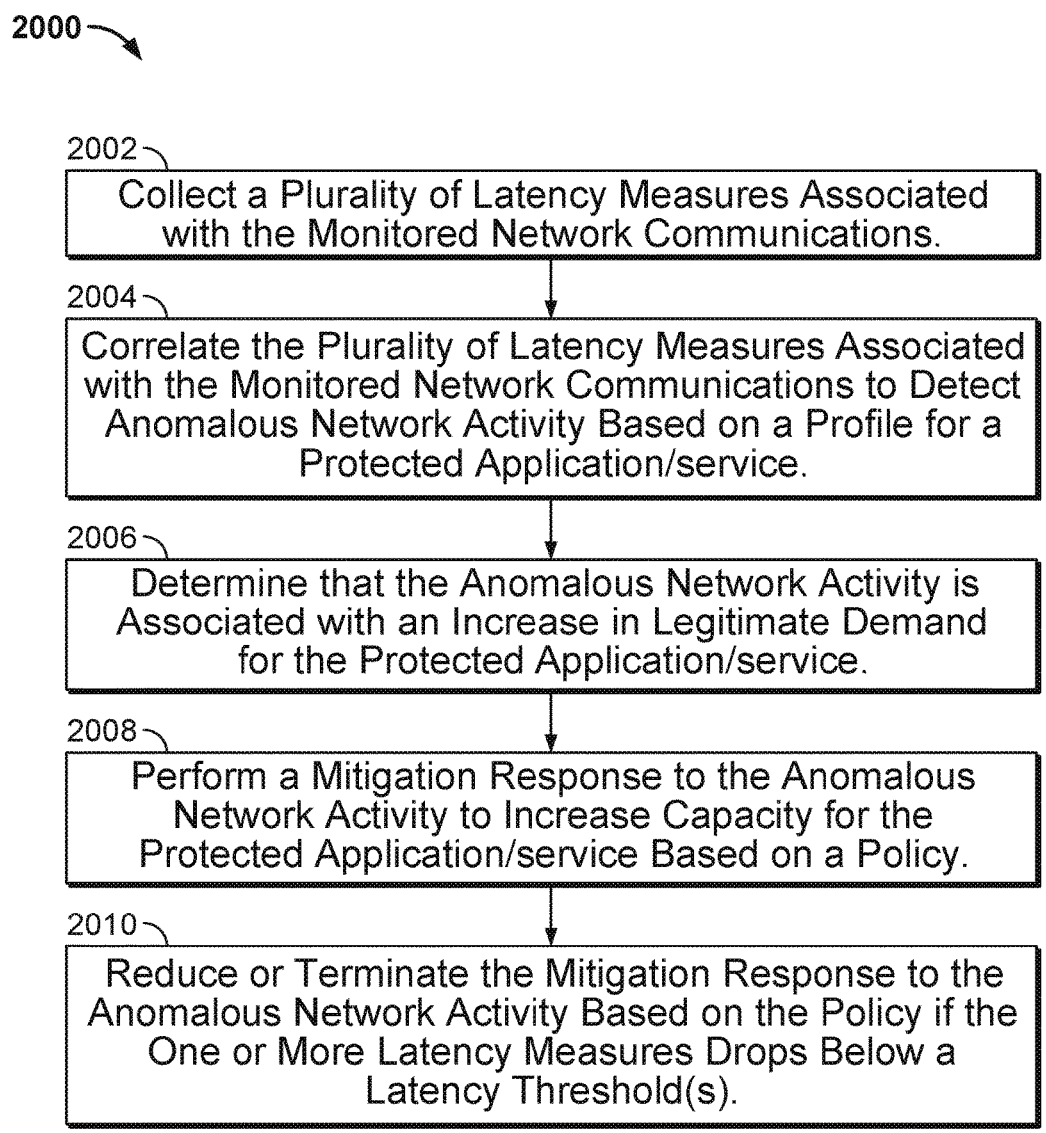
FIG. 20 is another flow diagram for performing latency-based policy activation in accordance with some embodiments.

FIG. 20 is another flow diagram for latency-based policy activation in accordance with some embodiments. In various embodiments, the process 2000 shown in FIG. 20 is performed by the data appliance (e.g., network device/firewall) as similarly described above with respect to FIGS. 1-5.

At 2002, a plurality of latency measures associated with the monitored network communications is collected. For example, network traffic can be monitored at a network device/firewall, such as data appliance 202 as shown in FIG. 2 and various latency measures can be collected (e.g., collected, received, calculated, measured, etc.) as similarly described above. Also, various network resource usage measurements can be collected by data appliance 202 by communicating with agents deployed on protected servers/network devices as also similarly described above.

At 2004, correlating the plurality of latency measures associated with the monitored network communications is performed to detect anomalous network activity based on a profile for a protected application/service. For example, one or more of the latency measures can be correlated (e.g., including using one or more network resource usage measurements) to detect illegitimate network activity/demand on a protected application/service based on a profile for the protected application/service, such as similarly described above with respect to FIG. 5.

At 2006, determining that the anomalous network activity is associated with an increase in legitimate demand for the protected application/service is performed.

At 2008, a mitigation response to the anomalous network activity to increase capacity for the protected application/service based on a policy is performed. For example, various mitigation responses can be performed for the protected application/service based on a policy to increase capacity, such as to generate an alert to an IT/network admin, to automatically spin-up one or more new virtual machines (VMs), communicate the increase in demand for the application/service to a network device/firewall manager, and/or other mitigation responses can be performed, such as similarly described above.

At 2010, the mitigation response(s) to the anomalous network activity based on the DoS policy is reduced or terminated based on the policy if the one or more latency measures drops below a latency threshold(s), such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for latency-based policy activation, comprising:
    a processor of a network device configured to:
        collect a plurality of latency measures associated with monitored network communications;
        correlate the plurality of latency measures associated with the monitored network communications to detect anomalous network activity based on a profile, comprising to:
            perform one or more of the following:
                A) determine whether a latency of an Internet Control Message Protocol (ICMP) ping between the network device and a monitored service's IP address exceeds a first predetermined threshold; and
                in response to a determination that the latency of the ICMP ping between the network device and the monitored service's IP address exceeds the first predetermined threshold, determine that the latency of the ICMP ping is abnormal;
                B) determine whether a latency between a new TCP session's SYN and a server's SYN/ACK response exceeds a second predetermined threshold; and
                in response to a determination that the latency between the new TCP session's SYN and the server's SYN/ACK response exceeds the second predetermined threshold, determine that the latency between the new TCP session's SYN and the server's SYN/ACK response is abnormal;
                C) determine whether a latency between a new UDP session's initial packets exceeds a third predetermined threshold; and
                in response to a determination that the latency between the new UDP session's initial packets exceeds the third predetermined threshold, determine that the latency between the new UDP session's initial packets is abnormal; or
                D) determine whether a latency of an HTTP GET operation or an HTTP POST operation exceeds a fourth predetermined threshold; and
                in response to a determination that the latency of the HTTP GET operation or the HTTP POST operation exceeds the fourth predetermined threshold, determine that the latency of the HTTP GET operation or the HTTP POST operation is abnormal;
        perform a mitigation response to the anomalous network activity based on a policy; and
    a memory coupled to the processor and configured to provide the processor with instructions.

2. The system recited in claim 1, wherein the anomalous network activity is determined to be associated with a Denial of Service (DoS) attack.

3. The system recited in claim 1, wherein the network device includes a firewall.

4. The system recited in claim 1, wherein the processor is further configured to:
    monitor network communications at the network device.

5. The system recited in claim 1, wherein the processor is further configured to:
    generate a profile for a protected application or a protected service on an enterprise network based on the plurality of latency measures associated with the monitored network communications, wherein the profile includes one or more latency thresholds.

6. The system recited in claim 1, wherein the processor is further configured to:
    dynamically update a profile for a protected application or a protected service on an enterprise network based on one or more latency measures associated with the protected application or the protected service on the enterprise network based on the monitored network communications.

7. The system recited in claim 1, wherein the processor is further configured to:
    send data associated with the anomalous network activity to another network device or a cloud security service.

8. The system recited in claim 1, wherein the processor is further configured to:
    receive data associated with another anomalous network activity from another network device or a cloud security service.

9. The system recited in claim 1, wherein anomalous network activity is determined to be associated with a Denial of Service (DoS) attack, and wherein the processor is further configured to:
    throttle or block network communications in response to the DoS attack based on the policy.

10. The system recited in claim 1, wherein the processor is further configured to:
    reduce or terminate the mitigation response if one or more of the latency measures no longer exceeds one or more latency thresholds.

11. The system recited in claim 1, wherein the correlating of the plurality of latency measures associated with the monitored network communications to detect anomalous network activity comprises to:
    perform five or more of the following:
        A) determine whether a latency of an Internet Control Message Protocol (ICMP) ping between the network device and a monitored service's IP address exceeds a first predetermined threshold; and
        in response to a determination that the latency of the ICMP ping between the network device and the monitored service's IP address exceeds the first predetermined threshold, determine that the latency of the ICMP ping is abnormal;
        B) determine whether a latency between a new TCP session's SYN and a server's SYN/ACK response exceeds a second predetermined threshold; and
        in response to a determination that the latency between the new TCP session's SYN and the server's SYN/ACK response exceeds the second predetermined threshold, determine that the latency between the new TCP session's SYN and the server's SYN/ACK response is abnormal;
        C) determine whether a latency between a new UDP session's initial packets exceeds a third predetermined threshold; and in response to a determination that the latency between the new UDP session's initial packets exceeds the third predetermined threshold, determine that the latency between the new UDP session's initial packets is abnormal;

D) determine whether a latency of an HTTP GET operation or an HTTP POST operation exceeds a fourth predetermined threshold; and in response to a determination that the latency of the HTTP GET operation or the HTTP POST operation exceeds the fourth predetermined threshold, determine that the latency of the HTTP GET operation or the HTTP POST operation is abnormal;

E) determine whether connections per second (CPS) for new connections accessing a server exceeds a fifth predetermined threshold; and in response to a determination that the CPS for the new connections accessing the server exceeds the fifth predetermined threshold, determine that the CPS for the new connections accessing the server is abnormal;

F) determine whether packets per second (PPS) for traffic flows going to and from the service exceeds a sixth predetermined threshold; and in response to a determination that the PPS for the traffic flows going to and from the service exceeds the sixth predetermined threshold, determine that the PPS for the traffic flows going to and from the service is abnormal; or G) determine whether bandwidth used by a protected service exceeds a seventh predetermined threshold; and in response to a determination that the bandwidth used by the protected service exceeds the seventh predetermined threshold, determine that the bandwidth used by the protected service is abnormal.

12. A method for latency-based policy activation, comprising:

collecting a plurality of latency measures associated with monitored network communications at a network device;

correlating the plurality of latency measures associated with the monitored network communications to detect anomalous network activity based on a profile using a processor of the network device, comprising:

performing one or more of the following:

A) determining whether a latency of an Internet Control Message Protocol (ICMP) ping between the network device and a monitored service's IP address exceeds a first predetermined threshold; and in response to a determination that the latency of the ICMP ping between the network device and the monitored service's IP address exceeds the first predetermined threshold, determining that the latency of the ICMP ping is abnormal;

B) determining whether a latency between a new TCP session's SYN and a server's SYN/ACK response exceeds a second predetermined threshold; and in response to a determination that the latency between the new TCP session's SYN and the server's SYN/ACK response exceeds the second predetermined threshold, determining that the latency between the new TCP session's SYN and the server's SYN/ACK response is abnormal;

C) determining whether a latency between a new UDP session's initial packets exceeds a third predetermined threshold; and in response to a determination that the latency between the new UDP session's initial packets exceeds the third predetermined threshold, determining that the latency between the new UDP session's initial packets is abnormal; or D) determining whether a latency of an HTTP GET operation or an HTTP POST operation exceeds a fourth predetermined threshold; and in response to a determination that the latency of the HTTP GET operation or the HTTP POST operation exceeds the fourth predetermined threshold, determining that the latency of the HTTP GET operation or the HTTP POST operation is abnormal;

and performing a mitigation response to the anomalous network activity based on a policy.

13. The method of claim 12, wherein the anomalous network activity is determined to be associated with a Denial of Service (DoS) attack.

14. The method of claim 12, wherein the network device includes a firewall.

15. The method of claim 12, further comprising:
monitoring network communications at the network device.

16. The method of claim 12, further comprising:
generating a profile for a protected application or a protected service on an enterprise network based on the plurality of latency measures associated with the monitored network communications, wherein the profile includes one or more latency thresholds.

17. A computer program product for latency-based policy activation, the computer program product being embodied in a tangible non-transitory computer readable storage medium and comprising computer instructions for:

collecting a plurality of latency measures associated with monitored network communications at a network device;

correlating the plurality of latency measures associated with the monitored network communications to detect anomalous network activity based on a profile, comprising:

performing one or more of the following:

A) determining whether a latency of an Internet Control Message Protocol (ICMP) ping between the network device and a monitored service's IP address exceeds a first predetermined threshold; and in response to a determination that the latency of the ICMP ping between the network device and the monitored service's IP address exceeds the first predetermined threshold, determining that the latency of the ICMP ping is abnormal;

B) determining whether a latency between a new TCP session's SYN and a server's SYN/ACK response exceeds a second predetermined threshold; and in response to a determination that the latency between the new TCP session's SYN and the server's SYN/ACK response exceeds the second predetermined threshold, determining that the latency between the new TCP session's SYN and the server's SYN/ACK response is abnormal;

C) determining whether a latency between a new UDP session's initial packets exceeds a third predetermined threshold; and
in response to a determination that the latency between the new UDP session's initial packets exceeds the third predetermined threshold, determining that the latency between the new UDP session's initial packets is abnormal; or
D) determining whether a latency of an HTTP GET operation or an HTTP POST operation exceeds a fourth predetermined threshold; and
in response to a determination that the latency of the HTTP GET operation or the HTTP POST operation exceeds the fourth predetermined threshold, determining that the latency of the HTTP GET operation or the HTTP POST operation is abnormal;
and performing a mitigation response to the anomalous network activity based on a policy.

18. The computer program product recited in claim 17, wherein the anomalous network activity is determined to be associated with a Denial of Service (DoS) attack.

19. The computer program product recited in claim 17, wherein the network device includes a firewall.

20. The computer program product recited in claim 17, further comprising computer instructions for:
monitoring network communications at the network device.

21. The computer program product recited in claim 17, further comprising computer instructions for:
generating a profile for a protected application or a protected service on an enterprise network based on the plurality of latency measures associated with the monitored network communications, wherein the profile includes one or more latency thresholds.

* * * * *